United States Patent
Benson et al.

(10) Patent No.: US 8,630,577 B2
(45) Date of Patent: Jan. 14, 2014

(54) ITEM BANKING SYSTEM FOR STANDARDS-BASED ASSESSMENT

(75) Inventors: Brian Benson, Tucson, AZ (US); John Robert Bergan, Tucson, AZ (US); Scott Cunningham, Tucson, AZ (US); Karyn Nochumsun, Tucson, AZ (US)

(73) Assignee: Assessment Technology Incorporated, Tucson, AZ (US)

( * ) Notice: Subject to any disclaimer, the term of this patent is extended or adjusted under 35 U.S.C. 154(b) by 589 days.

(21) Appl. No.: 12/222,384

(22) Filed: Aug. 7, 2008

(65) Prior Publication Data
US 2009/0164406 A1    Jun. 25, 2009

Related U.S. Application Data

(60) Provisional application No. 60/963,675, filed on Aug. 7, 2007, provisional application No. 60/963,676, filed on Aug. 7, 2007.

(51) Int. Cl.
*G09B 3/00* (2006.01)
(52) U.S. Cl.
USPC .......................................... 434/350; 434/322
(58) Field of Classification Search
USPC ................................. 434/322, 323, 350, 362
See application file for complete search history.

(56) References Cited

U.S. PATENT DOCUMENTS

| | | | |
|---|---|---|---|
| 4,967,354 A * | 10/1990 | Buchanan | 434/350 |
| 5,059,127 A | 10/1991 | Lewis | |
| 5,122,952 A | 6/1992 | Minkus | |
| 5,173,051 A | 12/1992 | May | |
| 5,174,759 A | 12/1992 | Preston | |
| 5,261,823 A | 11/1993 | Kurokawa | |
| 5,267,865 A | 12/1993 | Lee | |
| 5,295,836 A | 3/1994 | Ryu | |
| 5,310,349 A | 5/1994 | Daniels | |
| 5,326,270 A | 7/1994 | Ostby | |
| 5,411,271 A | 5/1995 | Mirando | |
| 5,537,587 A | 7/1996 | Kelley | |
| 5,558,520 A | 9/1996 | Werzberger | |
| 5,727,950 A | 3/1998 | Cook | |
| 5,730,604 A | 3/1998 | Jay | |
| 5,743,746 A | 4/1998 | Ho | |

(Continued)

OTHER PUBLICATIONS

Clive Thompson, "How Khan Academy is Changing the Rules of Education," Wired Aug. 2011, http://www.wired.com/magazine. 2011/07/ff_khan/all/1. downloaded Jul. 18, 2011.

(Continued)

*Primary Examiner* — Bruk Gebremichael
(74) *Attorney, Agent, or Firm* — Stolowitz Ford Cowger LLP

(57) ABSTRACT

An computer item banking system for standards-based assessments has test items used in standards-based assessments wherein a plurality of item specifications are developed using a specification building feature to create new, edit, move, and delete specifications and to assign specifications to one or more standards; a plurality of test items are constructed and edited using a test building feature to specify the type of item being constructed, points available for the item, and the type of bank to which the item is assigned; bank types include agency-wide assessments including benchmark tests and end-of-course examinations, and formative assessments such as classroom quizzes. The system includes means for certification of test items and preventing use of uncertified test items to be used in agency-wide assessments under construction.

16 Claims, 33 Drawing Sheets

Item Banks - Item Construction

(56) References Cited

U.S. PATENT DOCUMENTS

| | | | |
|---|---|---|---|
| 5,779,486 A | 7/1998 | Ho | |
| 5,823,788 A | 10/1998 | Lemelson | |
| 5,823,789 A | 10/1998 | Jay | |
| 5,829,983 A | 11/1998 | Koyama | |
| 5,835,758 A | 11/1998 | Nochur | |
| 5,864,869 A | 1/1999 | Doak | |
| 5,893,717 A | 4/1999 | Kirsch | |
| 5,904,485 A | 5/1999 | Siefert | |
| 5,967,793 A | 10/1999 | Ho | |
| 6,024,577 A | 2/2000 | Wadahama | |
| 6,029,043 A | 2/2000 | Ho | |
| 6,042,384 A | 3/2000 | Loiacono | |
| 6,044,387 A | 3/2000 | Angiulo | |
| 6,077,085 A | 6/2000 | Parry | |
| 6,091,930 A | 7/2000 | Mortimer | |
| 6,112,049 A | 8/2000 | Sonnenfeld | |
| 6,118,973 A | 9/2000 | Ho | |
| 6,120,300 A | 9/2000 | Ho | |
| 6,139,330 A | 10/2000 | Ho | |
| 6,149,441 A | 11/2000 | Pellegrino | |
| 6,202,060 B1 | 3/2001 | Tran | |
| 6,261,103 B1 | 7/2001 | Stephens | |
| 6,263,434 B1 | 7/2001 | Hanna | |
| 6,269,355 B1 | 7/2001 | Grimse | |
| 6,305,942 B1 | 10/2001 | Block | |
| 6,315,572 B1* | 11/2001 | Owens et al. | 434/322 |
| 6,322,366 B1 | 11/2001 | Bergan | |
| 6,341,212 B1* | 1/2002 | Shende et al. | 434/350 |
| 6,353,447 B1 | 3/2002 | Truluck | |
| 6,418,298 B1 | 7/2002 | Sonnenfeld | |
| 6,496,681 B1 | 12/2002 | Linton | |
| 6,498,920 B1 | 12/2002 | Simon | |
| 6,505,031 B1 | 1/2003 | Slider | |
| 6,535,713 B1 | 3/2003 | Houlihan | |
| 6,547,568 B1 | 4/2003 | Yamano | |
| 6,554,618 B1 | 4/2003 | Lockwood | |
| 6,561,812 B1 | 5/2003 | Burmester | |
| 6,592,379 B1 | 7/2003 | Stuppy | |
| 6,676,413 B1 | 1/2004 | Best | |
| 6,685,478 B2 | 2/2004 | Ho | |
| 6,769,915 B2 | 8/2004 | Murgia | |
| 6,773,266 B1 | 8/2004 | Dornbush | |
| 6,789,047 B1 | 9/2004 | Woodson | |
| 6,793,129 B2 | 9/2004 | Wood | |
| 6,904,263 B2 | 6/2005 | Grudnitski | |
| 7,031,651 B2 | 4/2006 | McCormick | |
| 7,165,012 B2* | 1/2007 | Swanson | 702/182 |
| 7,311,524 B2 | 12/2007 | Jennen | |
| 7,362,997 B2 | 4/2008 | Hartenberger | |
| 2001/0034016 A1 | 10/2001 | Ziv-el | |
| 2001/0039000 A1 | 11/2001 | Parsons | |
| 2002/0177109 A1 | 11/2002 | Robinson | |
| 2002/0192631 A1 | 12/2002 | Weir | |
| 2002/0199118 A1* | 12/2002 | Yardley et al. | 713/201 |
| 2003/0017442 A1* | 1/2003 | Tudor et al. | 434/322 |
| 2003/0027121 A1 | 2/2003 | Grudnitski | |
| 2003/0039949 A1 | 2/2003 | Cappellucci | |
| 2003/0180703 A1 | 9/2003 | Yates | |
| 2004/0002039 A1 | 1/2004 | Draper | |
| 2004/0002049 A1 | 1/2004 | Beavers | |
| 2004/0063085 A1 | 4/2004 | Ivanir | |
| 2004/0115608 A1 | 6/2004 | Meyer | |
| 2004/0219504 A1* | 11/2004 | Hattie | 434/353 |
| 2004/0229199 A1* | 11/2004 | Ashley et al. | 434/323 |
| 2005/0110461 A1 | 5/2005 | McConnell | |
| 2005/0114160 A1* | 5/2005 | Boehme et al. | 705/1 |
| 2005/0125196 A1* | 6/2005 | Swanson | 702/182 |
| 2005/0170325 A1* | 8/2005 | Steinberg et al. | 434/350 |
| 2005/0250087 A1* | 11/2005 | Driscoll et al. | 434/350 |
| 2006/0003306 A1* | 1/2006 | McGinley et al. | 434/350 |
| 2006/0046237 A1* | 3/2006 | Griffin et al. | 434/322 |
| 2006/0078863 A1 | 4/2006 | Coleman | |
| 2006/0172274 A1* | 8/2006 | Nolasco | 434/350 |
| 2006/0199163 A1* | 9/2006 | Johnson | 434/322 |
| 2006/0216683 A1 | 9/2006 | Goradia | |
| 2006/0294552 A1 | 12/2006 | Swanson | |
| 2007/0099169 A1 | 5/2007 | Beamish | |
| 2007/0111180 A1 | 5/2007 | Sperle | |
| 2007/0122788 A1* | 5/2007 | Stevens, Jr. | 434/323 |
| 2007/0160969 A1 | 7/2007 | Barton | |
| 2007/0178432 A1 | 8/2007 | Davis | |
| 2008/0038705 A1* | 2/2008 | Kerns et al. | 434/309 |
| 2008/0040502 A1 | 2/2008 | Holsberry | |
| 2008/0187893 A1 | 8/2008 | Blaustein | |

OTHER PUBLICATIONS

Foley, Jim. Integrating Computer Technology, People Technology and Application Technology: Strategies and Case Studies from Georgia Tech's Graphic, Visualization and Usability Center, Proceeding of the Workshop on Advanced Visual Interfaces, 1994, pp. 34-43.

Kelly et al., Qualitative Observations from Software Code Inspection Experiments, IBM Centre for Advance Studies Conference, 2002, p. 5.

Villiers De Ruth. Usability evaluation of an e-learning totorial: Criteria, Questions and Case Study, ACM International Conference Proceedings Series; vol. 75, 2004, p. 284-291.

Thissen et al., "Item Response Theory for Scores on Tests including Polychotomous Items with Ordered Response," The L.L. Thurstone Phychometric Laboratory, University of North Carolina, Research Report No. 94-2, May 1994.

Stolowitz Ford Cower LLP List of Related Matters dated Dec. 23, 2011; 1 page.

* cited by examiner

1. 'None,' 'Formative' or 'Benchmark'
2. 'Multiple Choice,' 'True/False,' 'Yes/No,' 'Short Answer,' 'Essay' or 'Submit Work Sample'

Item Bank - Edit Folder

Item Bank - Edit Item Specification

FIG. 22

FIG. 25 ical management system has been designed to assist programs to promote goal-directed standards-based learning for example as described in U.S. Pat. No. 6,322,366 and No. 6,468,085. The present patent application details additional innovations that enhance the usefulness of the system for learners involved in a variety of standards-based educational programs. A particularly important group of such learners is comprised of elementary and secondary school students receiving instruction aimed at the achievement of federal, state, and local standards.

ITEM BANKING SYSTEM FOR STANDARDS-BASED ASSESSMENT

CROSS-REFERENCE TO RELATED APPLICATIONS

This application is related to U.S. Pat. Nos. 6,322,366, 6,468,085 and 7,065,516 and U.S. patent application Ser. No. 11/009,708, all of which patents and application are expressly incorporated in their entirety herein. This application claims benefit under 35 U.S.C. §119(e)(1) of U.S. Provisional Patent Applications 60/963,675 and 60/963,676 filed Aug. 7, 2007, which are expressly incorporated in their entirety herein. Additionally the disclosure in U.S. Published Patent Application 2003/00044762 is expressly incorporated in its entirety herein.

BACKGROUND OF THE INVENTION

A major challenge facing educational programs in the $21^{st}$ century is to promote learning aimed at the achievement of valued goals or standards. In an effort to assist educators to meet this challenge, an educational management system has been designed to assist programs to promote goal-directed standards-based learning for example as described in U.S. Pat. No. 6,322,366 and No. 6,468,085. The present patent application details additional innovations that enhance the usefulness of the system for learners involved in a variety of standards-based educational programs. A particularly important group of such learners is comprised of elementary and secondary school students receiving instruction aimed at the achievement of federal, state, and local standards.

In one educational management system, instruction to promote goal-directed learning is informed by assessment information indicating the capabilities that a learner has acquired and those that the learner will be ready to learn in the future. Item Response Theory (IRT) is used to estimate the probability that a learner will be ready to acquire capabilities reflecting goals that have not yet been mastered. There is room for innovations that enhance the construction of assessments and the use of assessment information to inform goal-directed standards-based learning.

BRIEF SUMMARY OF THE INVENTION

The present invention includes new technology to enhance the efficiency of constructing and maintaining item banks containing collections of items used in assessment initiatives requiring that test items be aligned to standards. Standards-based assessment initiatives provide a particularly important example of circumstances calling for the alignment of items to standards (e.g., Ravitch, 2001). In order to construct standards-based assessments using an item bank, bank information must include information on the standards to which the items are aligned.

The present invention can be summarized in an item banking system for test items used in standards-based assessments including: (a) Item specifications developed using a Bank Builder feature to create new, edit, move, or delete specifications or assign specifications to one or more standards. (b) Test items constructed and edited using a Bank Builder feature to specify the type of item being constructed, points available for the item, and the type of bank to which the item is assigned. Bank types include: (i) Agency-wide assessments such as benchmark tests and end-of-course examinations. (ii) Formative assessments such as classroom quizzes. (c) Item review and certification, including: (i) In-system item review, directly linked to an item specification and including all items associated with the selected specification. (ii) Allowance for the reviewer to classify items in terms of review categories, e.g. Not Reviewed, Needs Modification, Accept, and Accept and Certify. (iii) Item display by category. (iv) Ability for item reviewers to include comments on the item being reviewed. (v) Item writer response to review comments and direct access to the reviewed item for editing. (vi) System protection from using not yet certified items to be used in assessments under construction. (d) Classification and mapping procedures that make it possible to efficiently map items to multiple sets of standards. Items may be mapped to item specifications, which are then mapped to standards in multiple states. (i) Data objects are classified as test items, item attributes, and item specifications using a hierarchical tree structure. (ii) Sets of items may be matched to each standard. (iii) An item and a specification can be mapped to only one class. (iv) An item class can be mapped to only one standard within a given set of standards. (v) Sets of items can be mapped to more than one standard when each standard is in a different set of standards. (vi) This hierarchal model method differs from cross-indexed mapping of items to multiple-state standards. (vii) Provides increased information for the alignment of a set of items to a particular standard. (e) The ability to leverage the formative item bank as an element of K-12 instruction.

BRIEF DESCRIPTION OF THE DRAWINGS

FIGS. 2, 3, 5, 6, 8, 9, 11, 12, 14, 15, 16, 18, 19, 21, 22, 24, 25, 27, 28, 30, 31, 32 and 33 are illustrations of computer screens of the item banking system for standards-based assessment of the present invention setting forth various steps the above step diagrams.

DETAILED DESCRIPTION OF THE INVENTION

Figure 1:
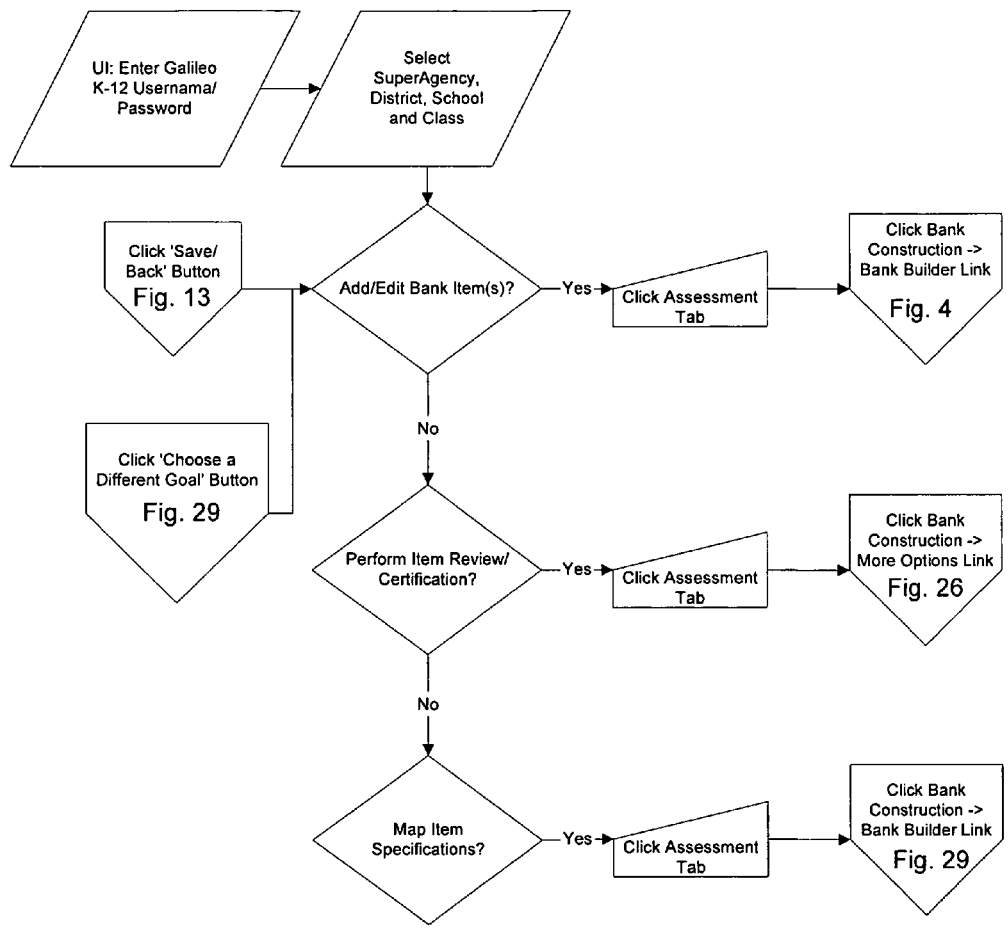
FIGS. 1, 4, 7, 10, 13, 17, 20, 23, 26 and 29 are step diagrams setting forth the operation and construction of the item banking system for standards-based assessment of the present invention.
Figure 2:
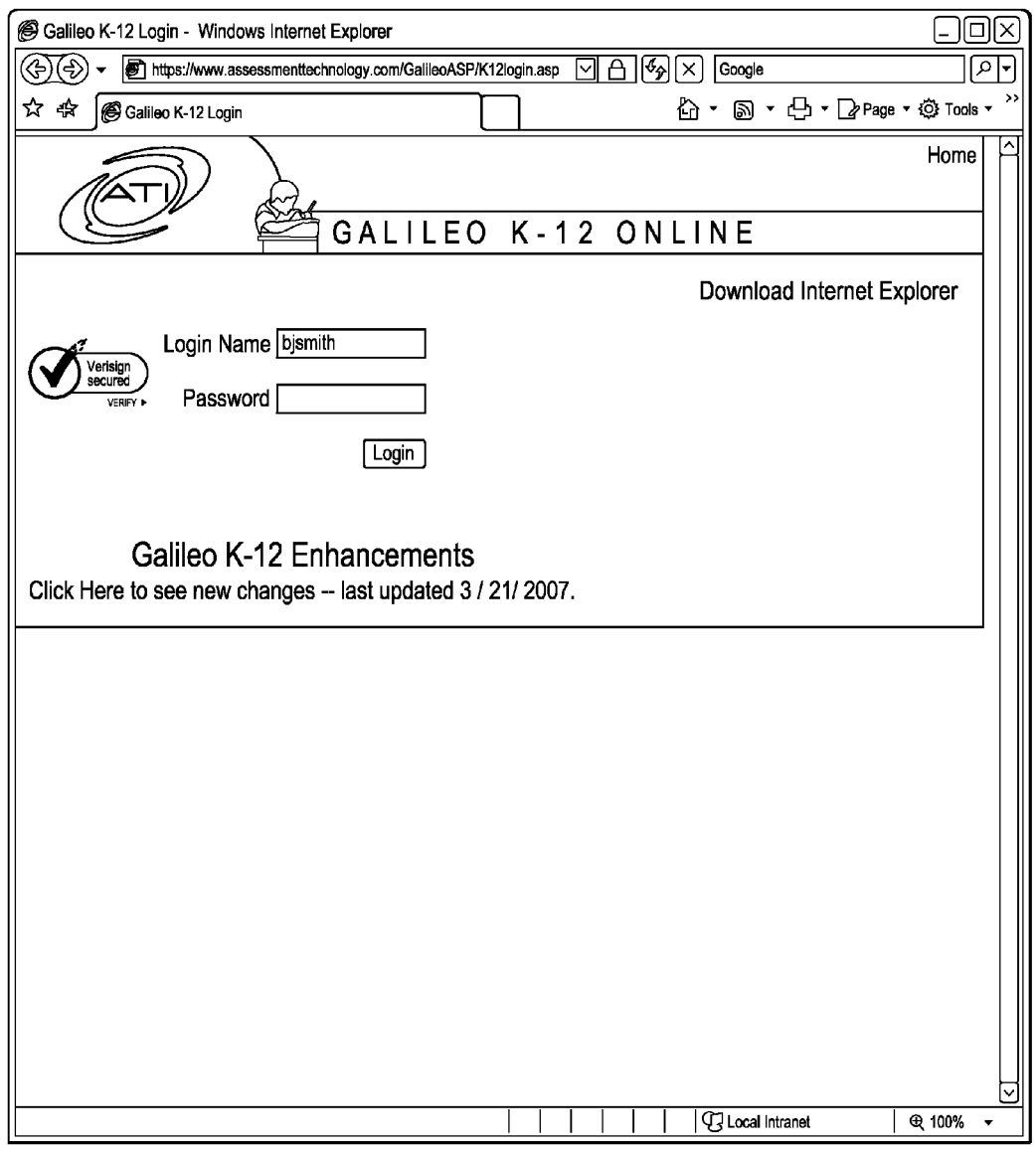
Figure 3:
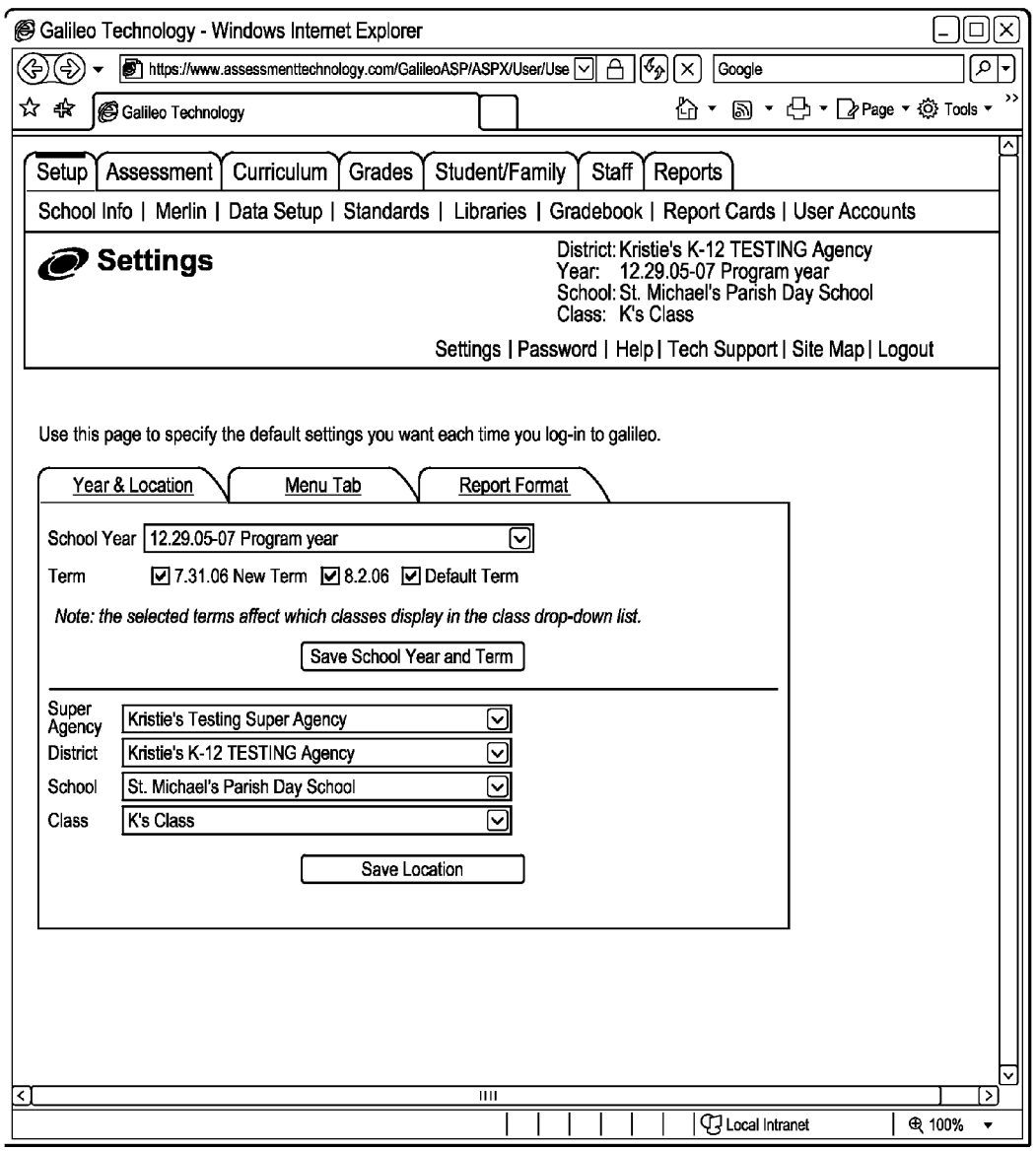
Figure 4:
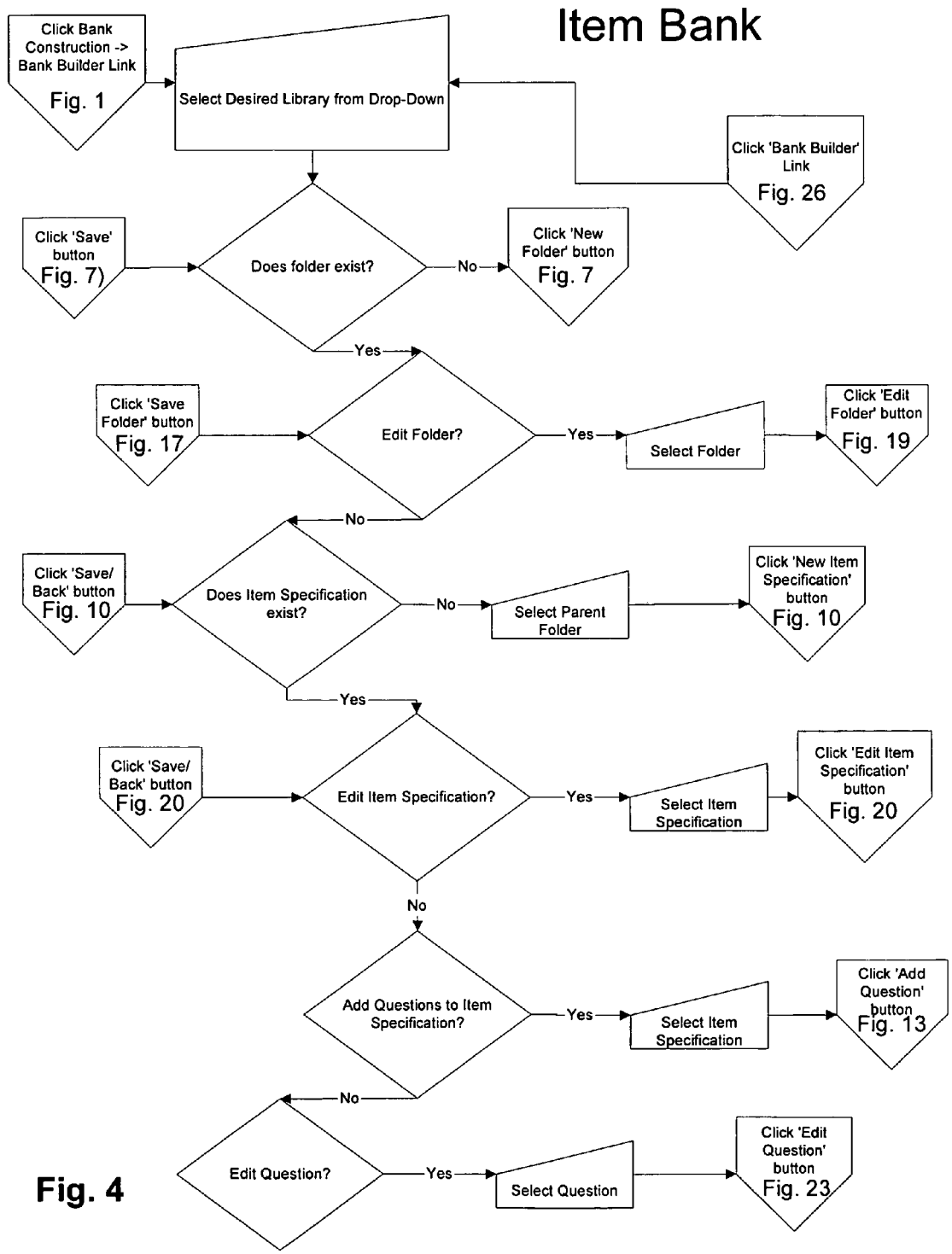
Figure 5:
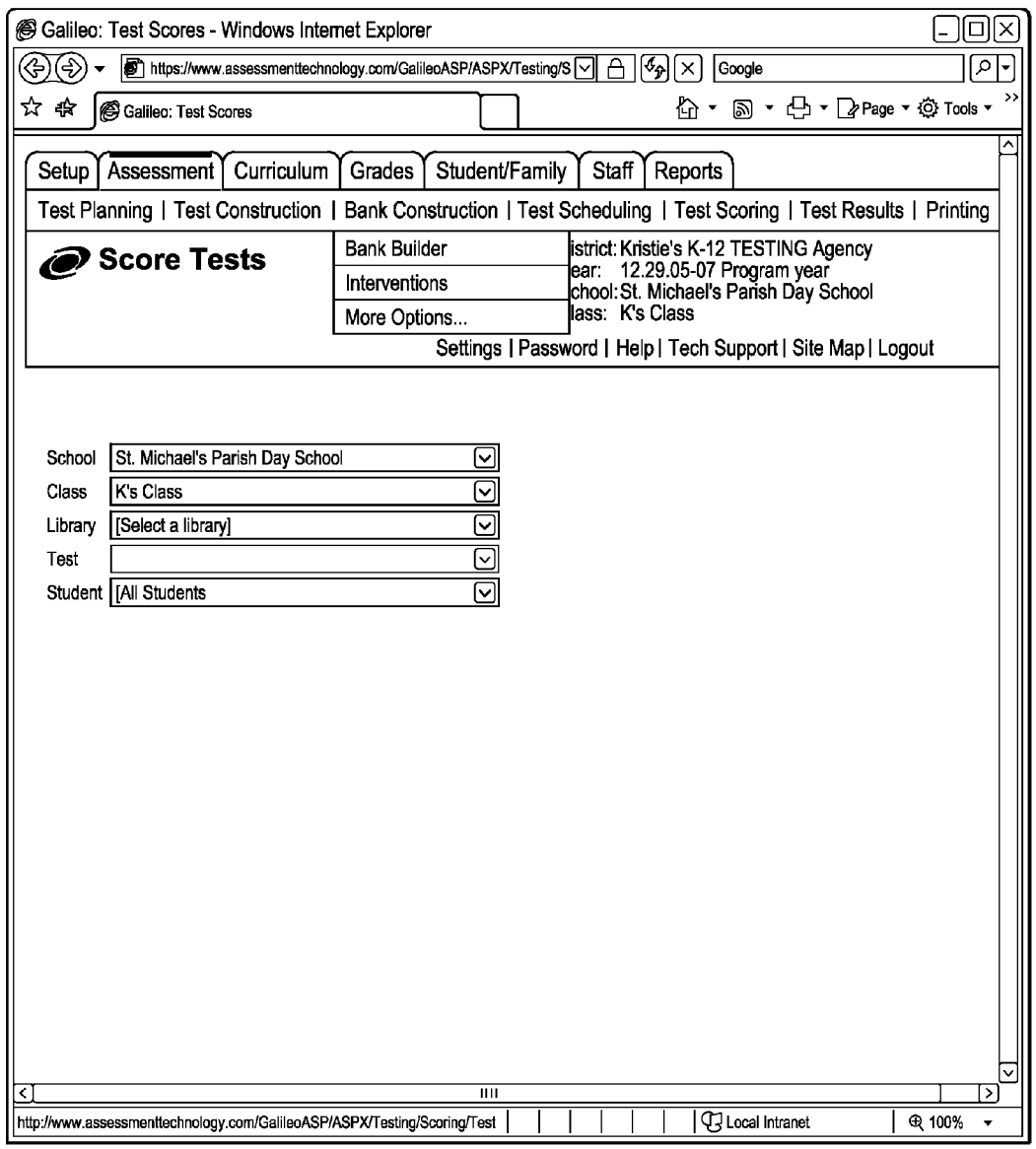
Figure 6:
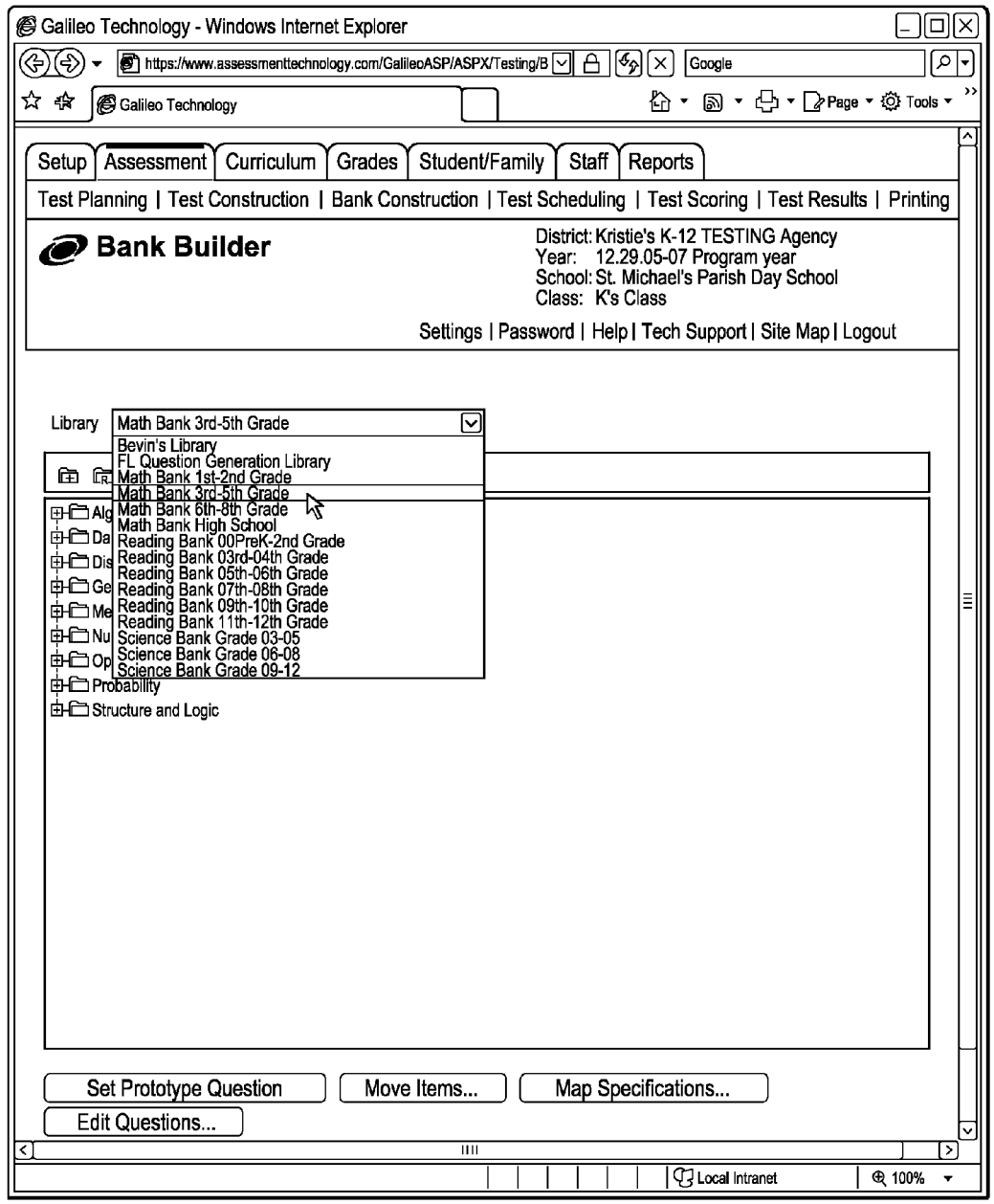
Figure 7:
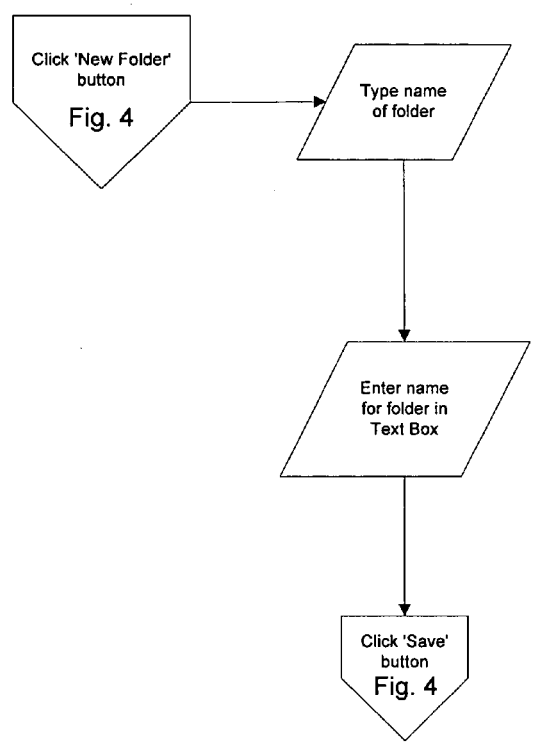
Figure 8:
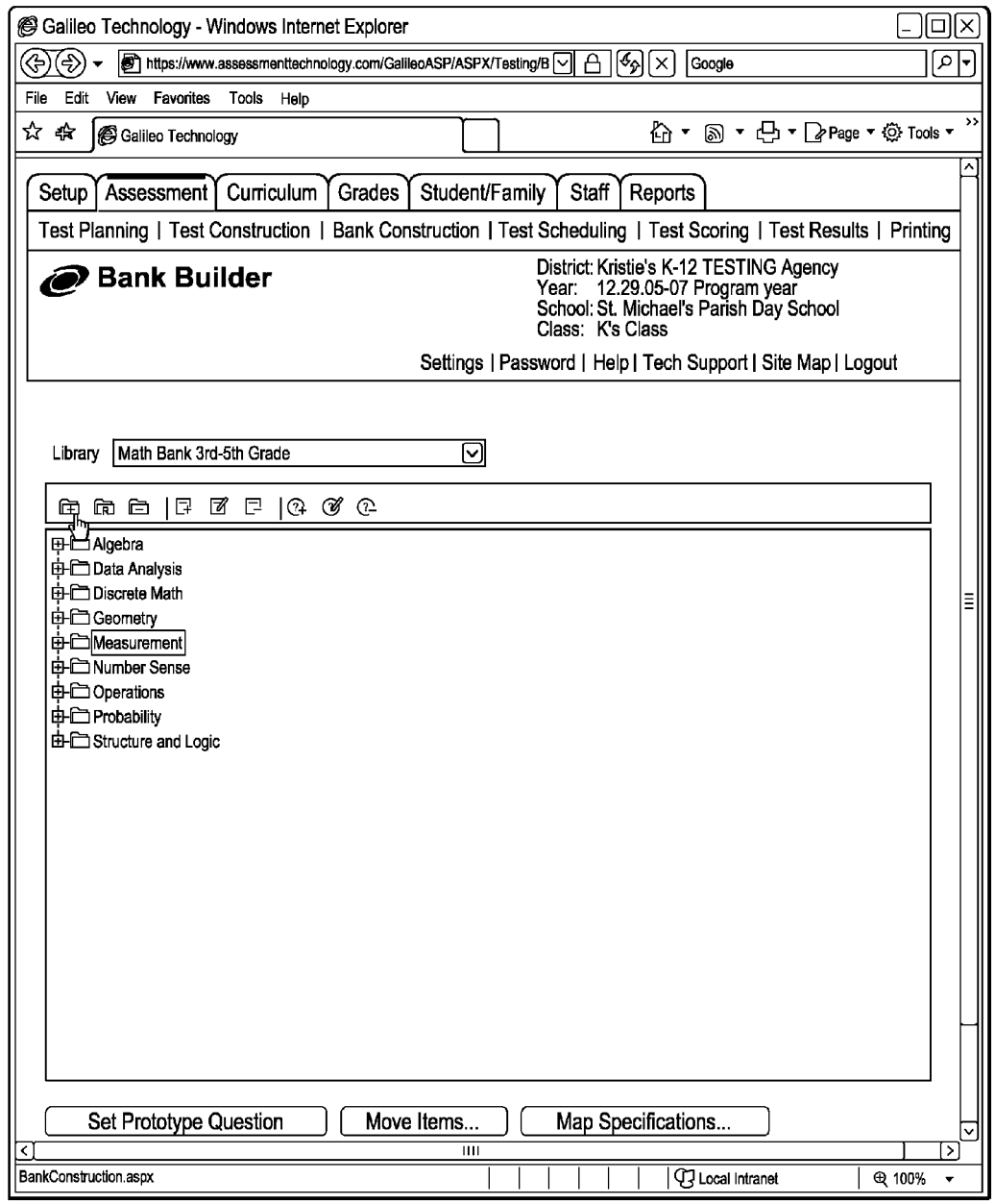
Figure 9:
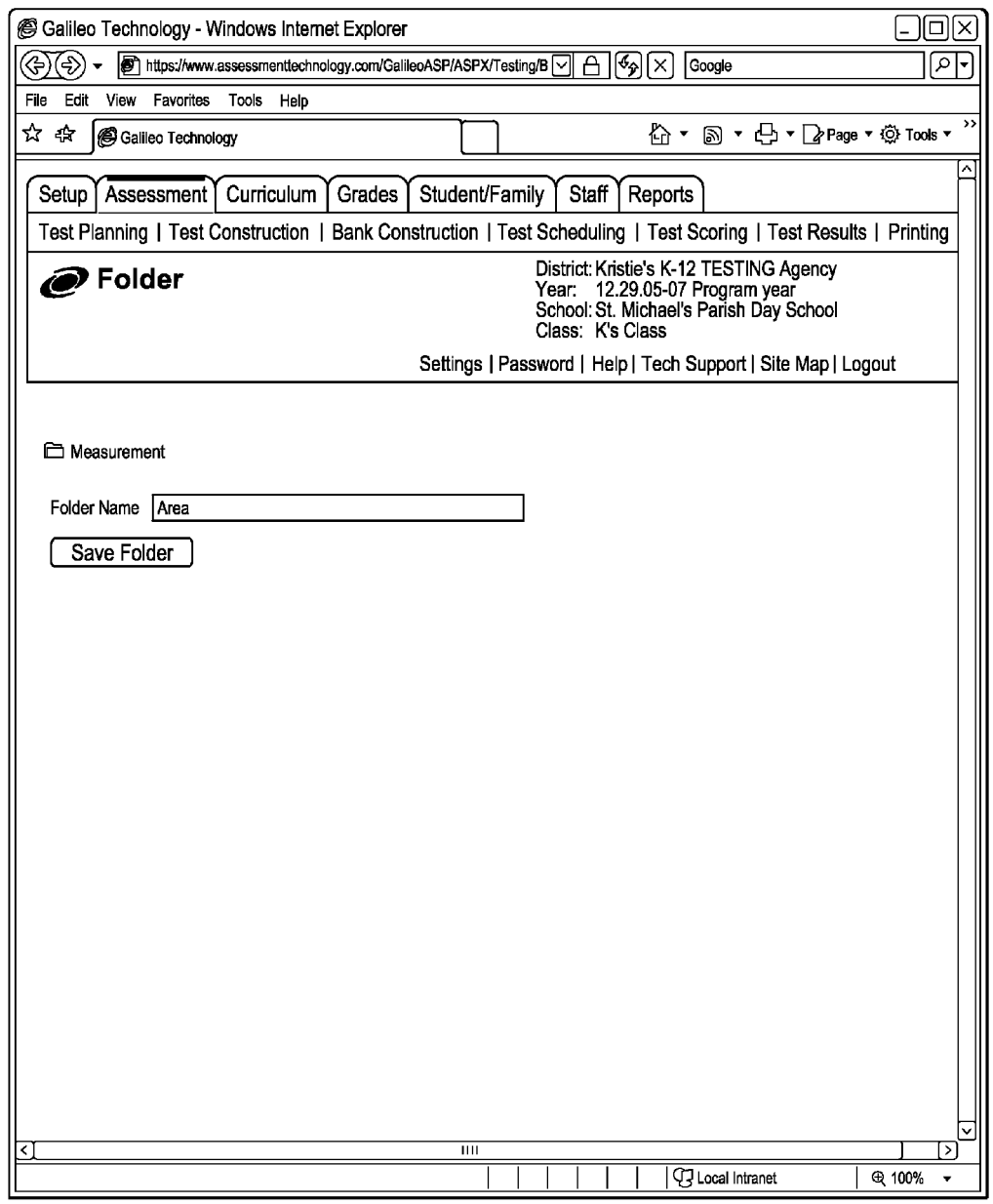
Figure 10:
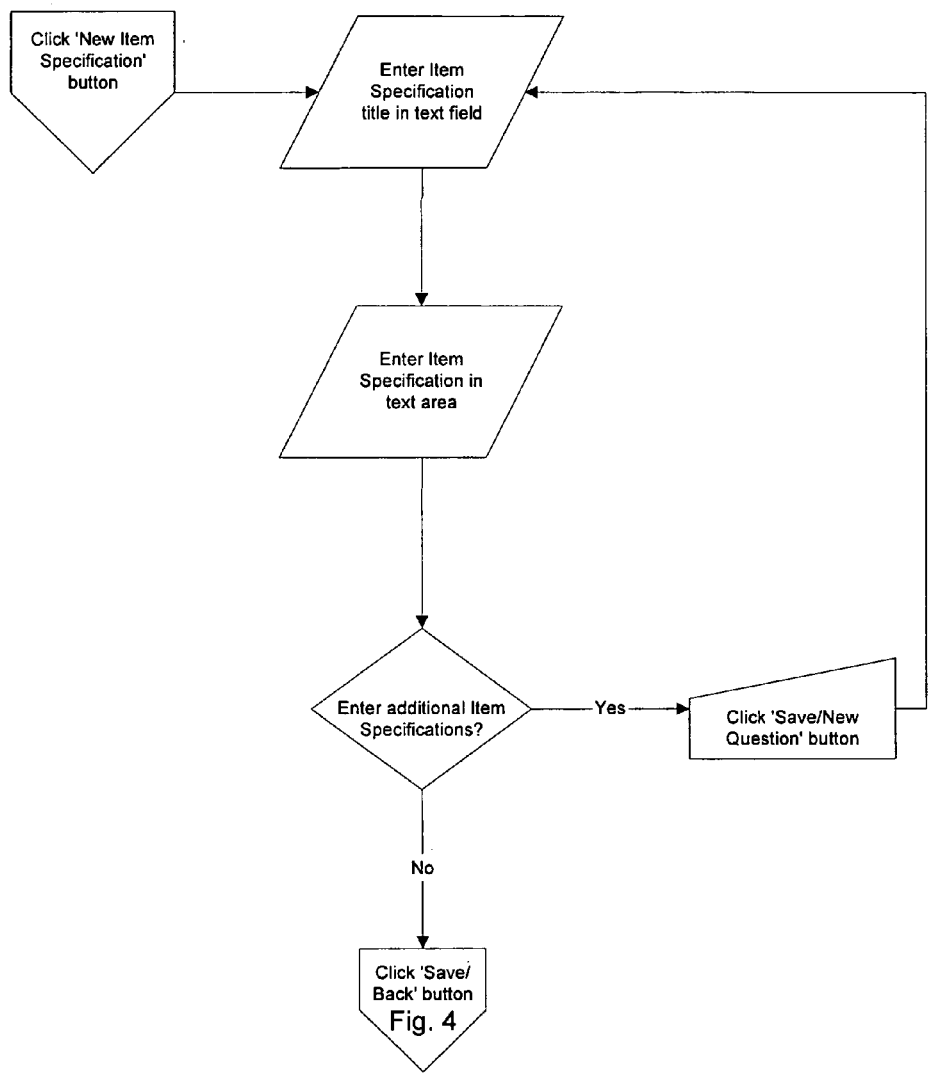
Figure 11:
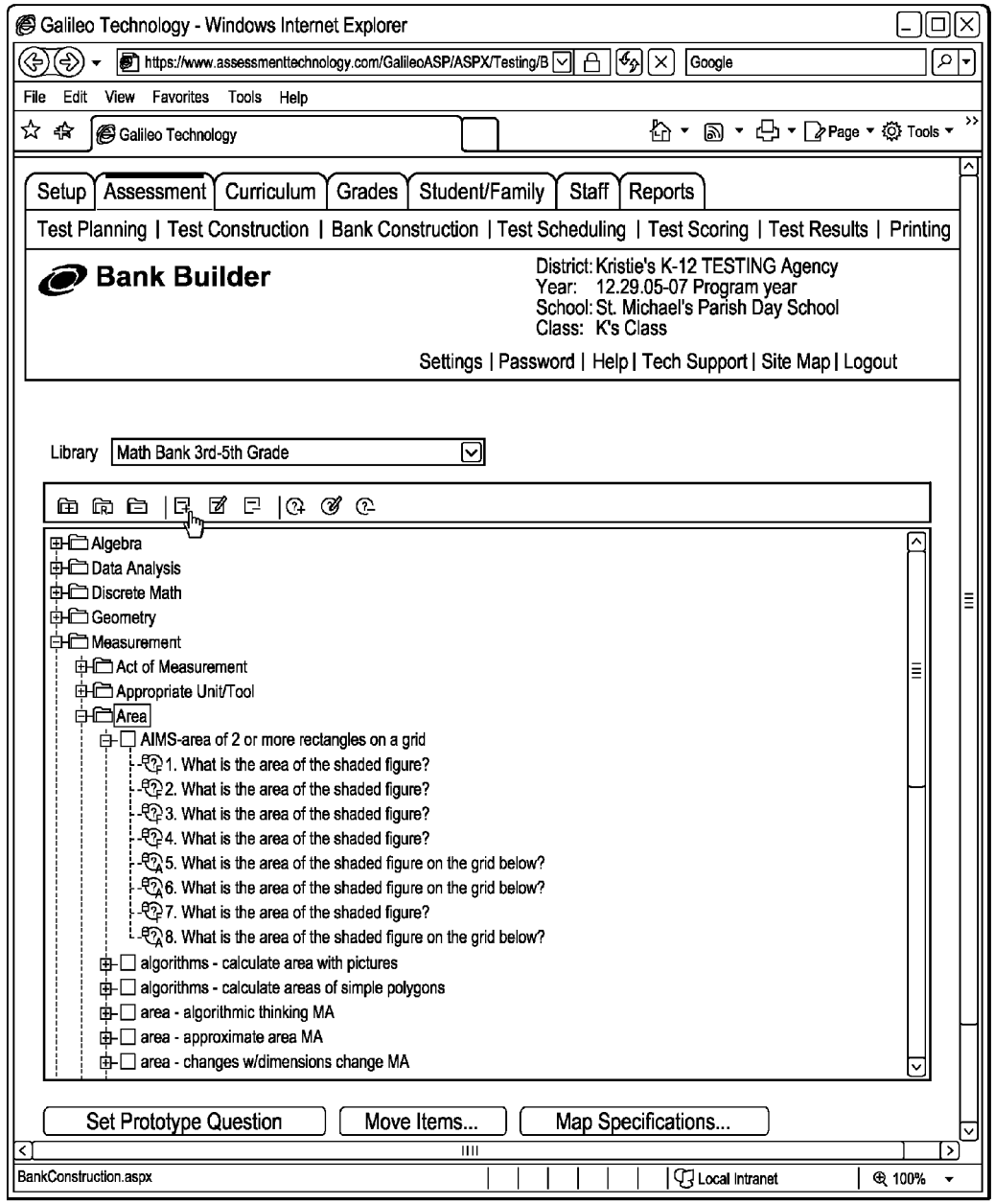
Figure 12:
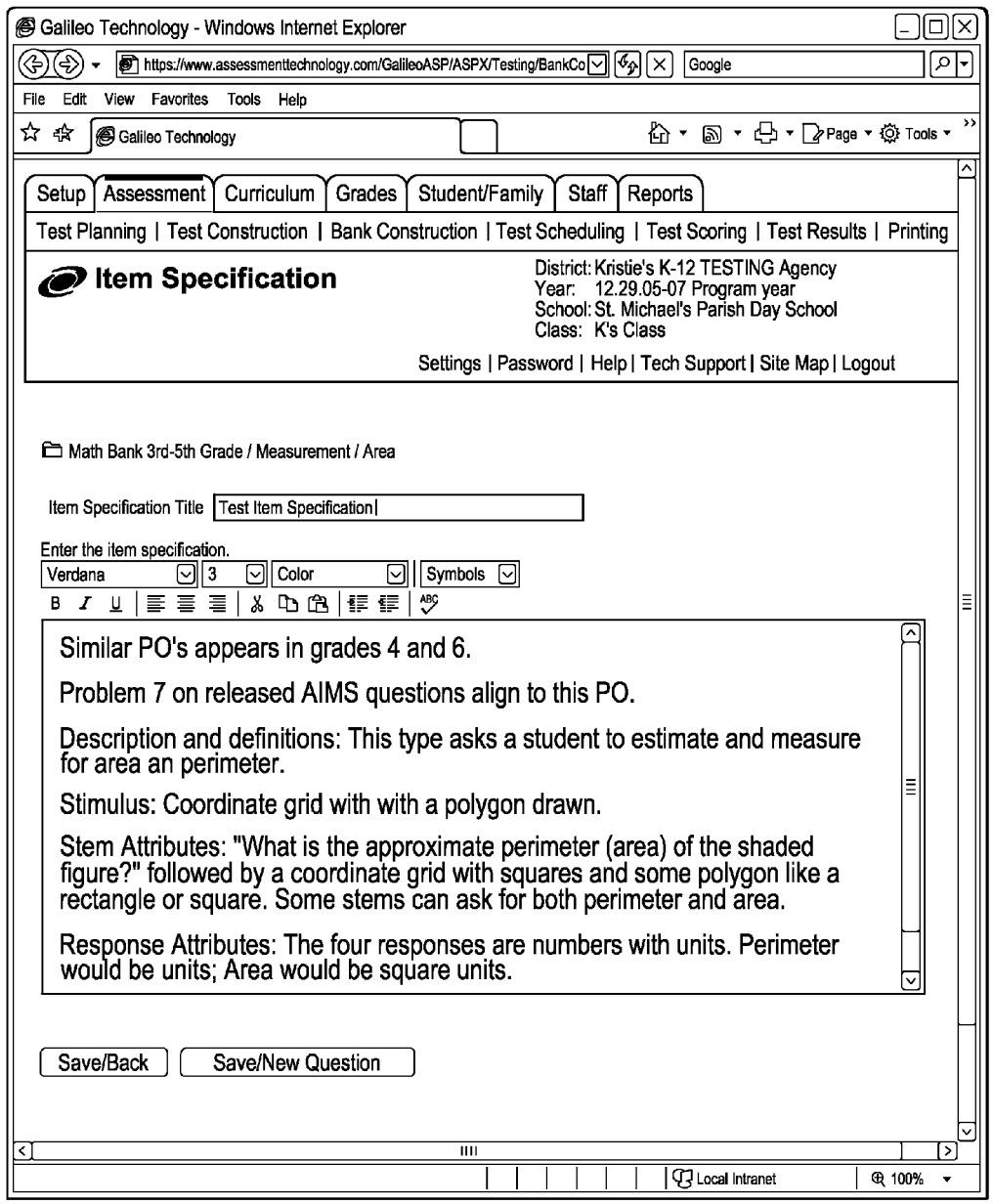
Figure 13:
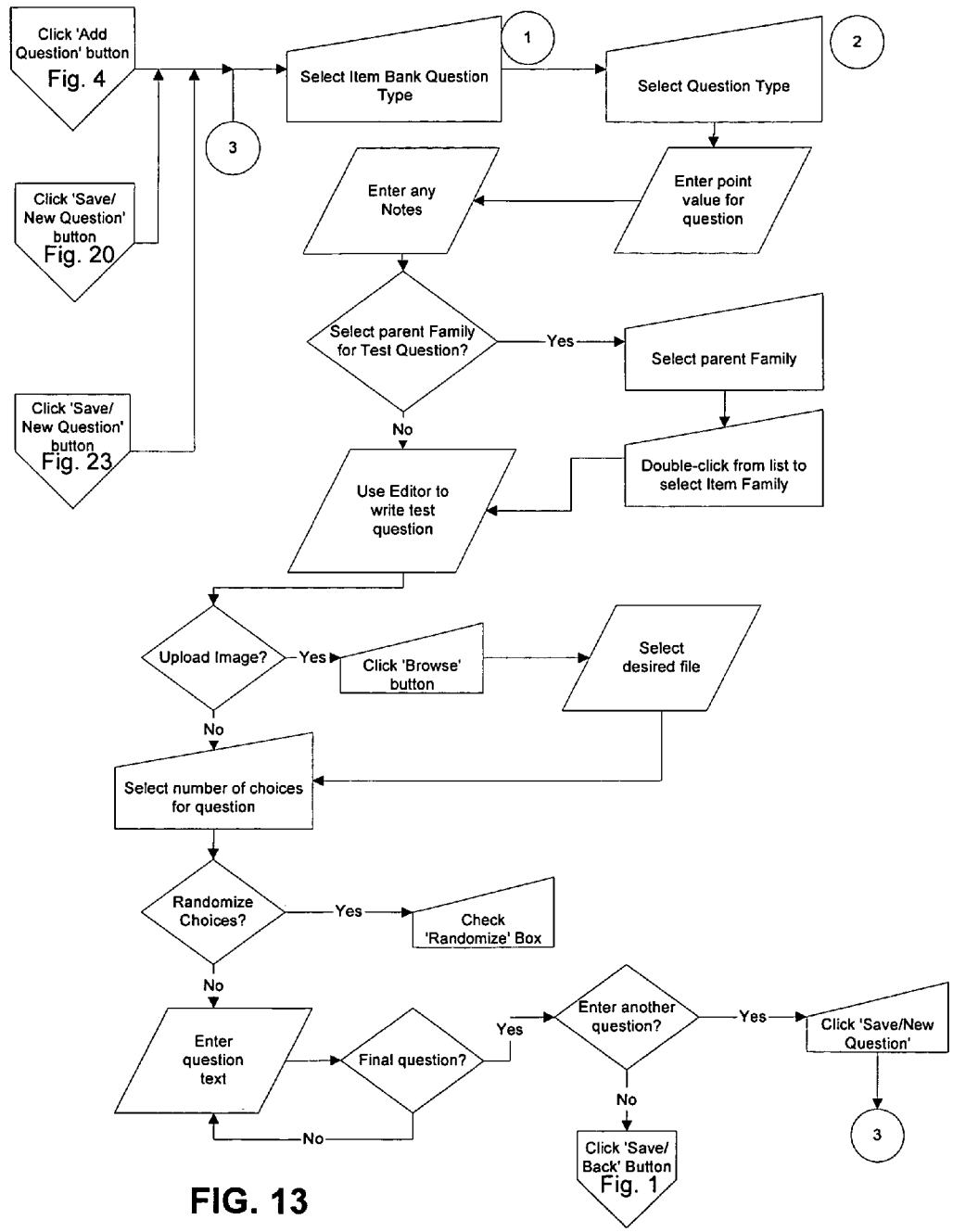
Figure 14:
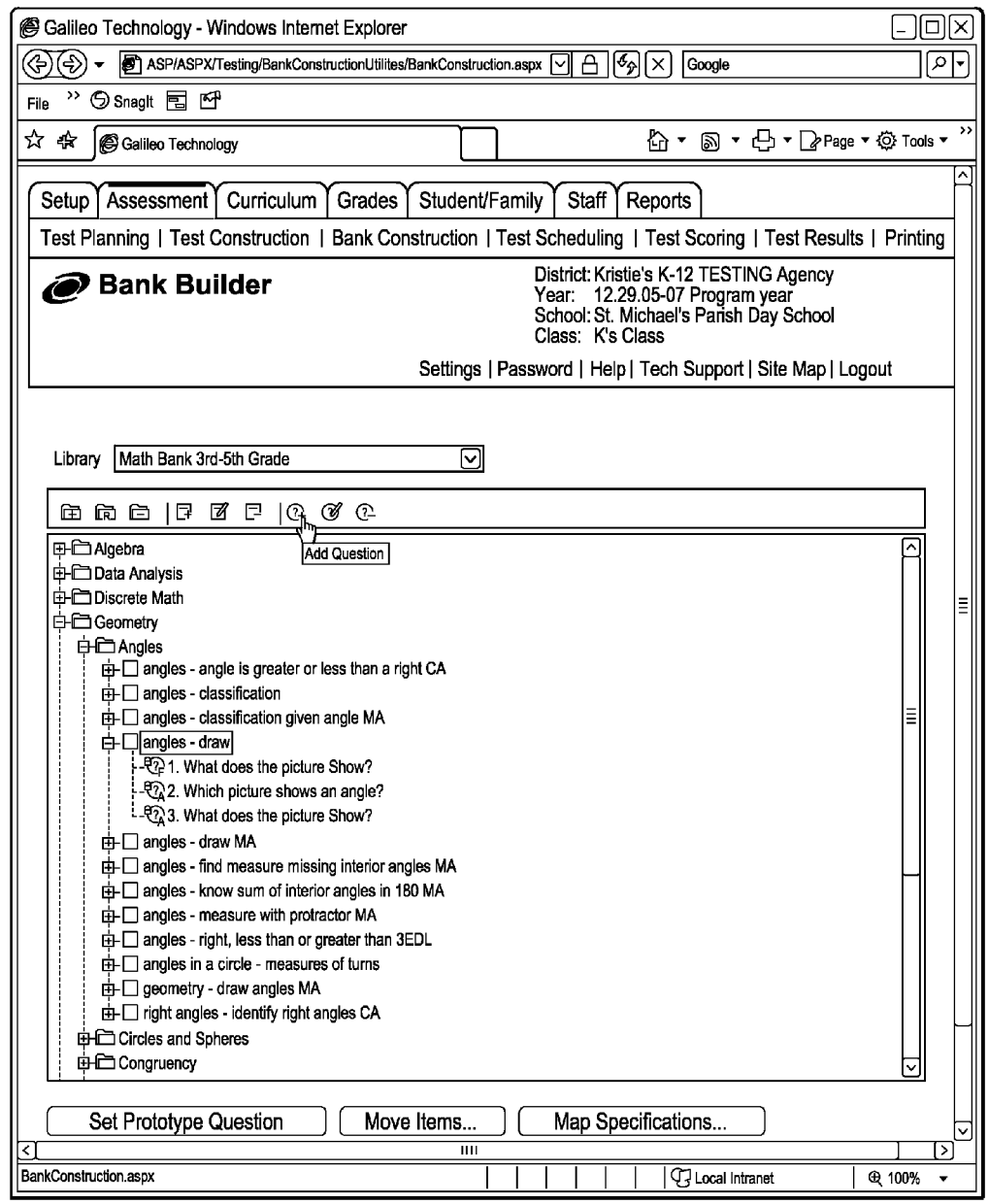
Figure 15:
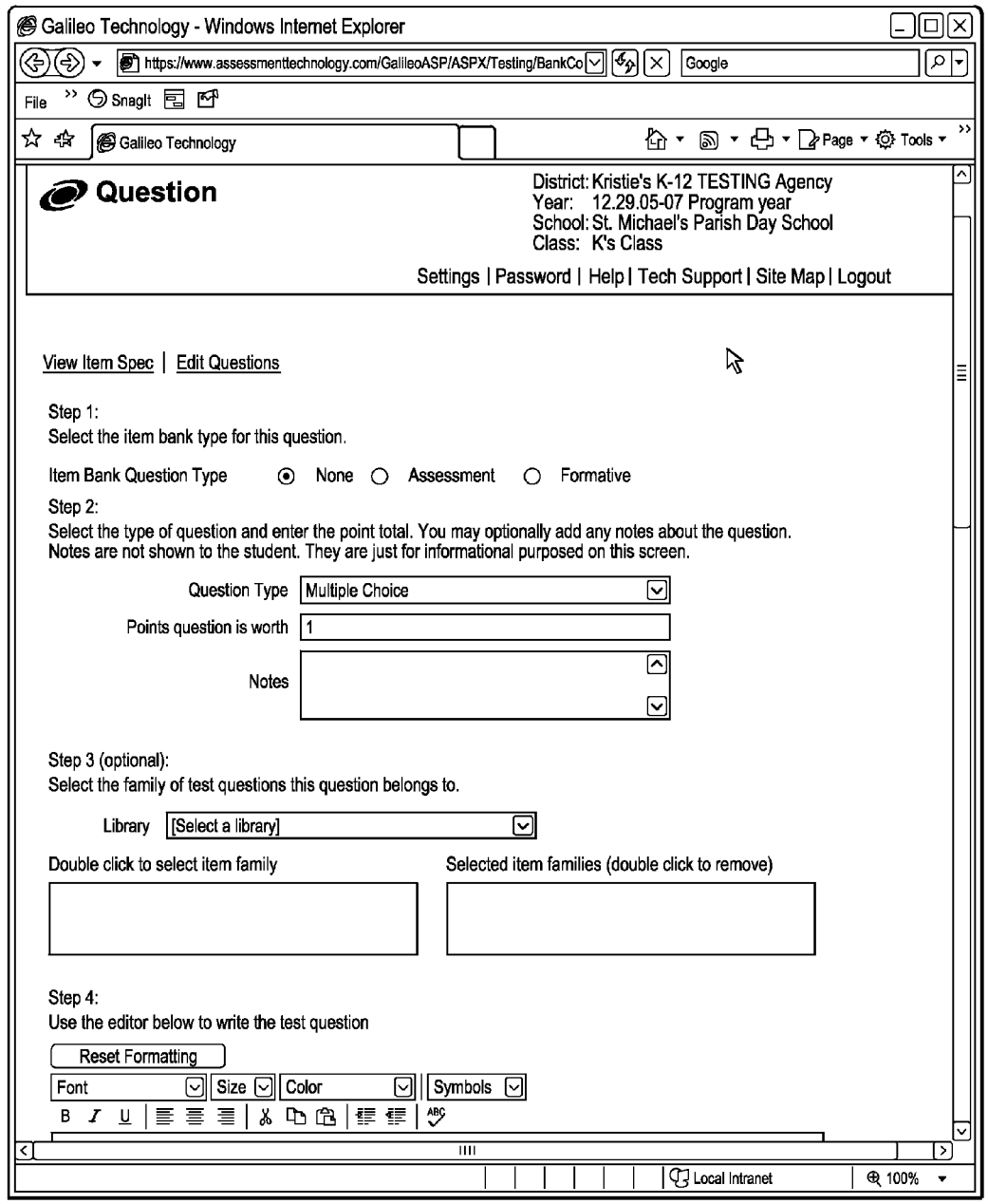
Figure 16:
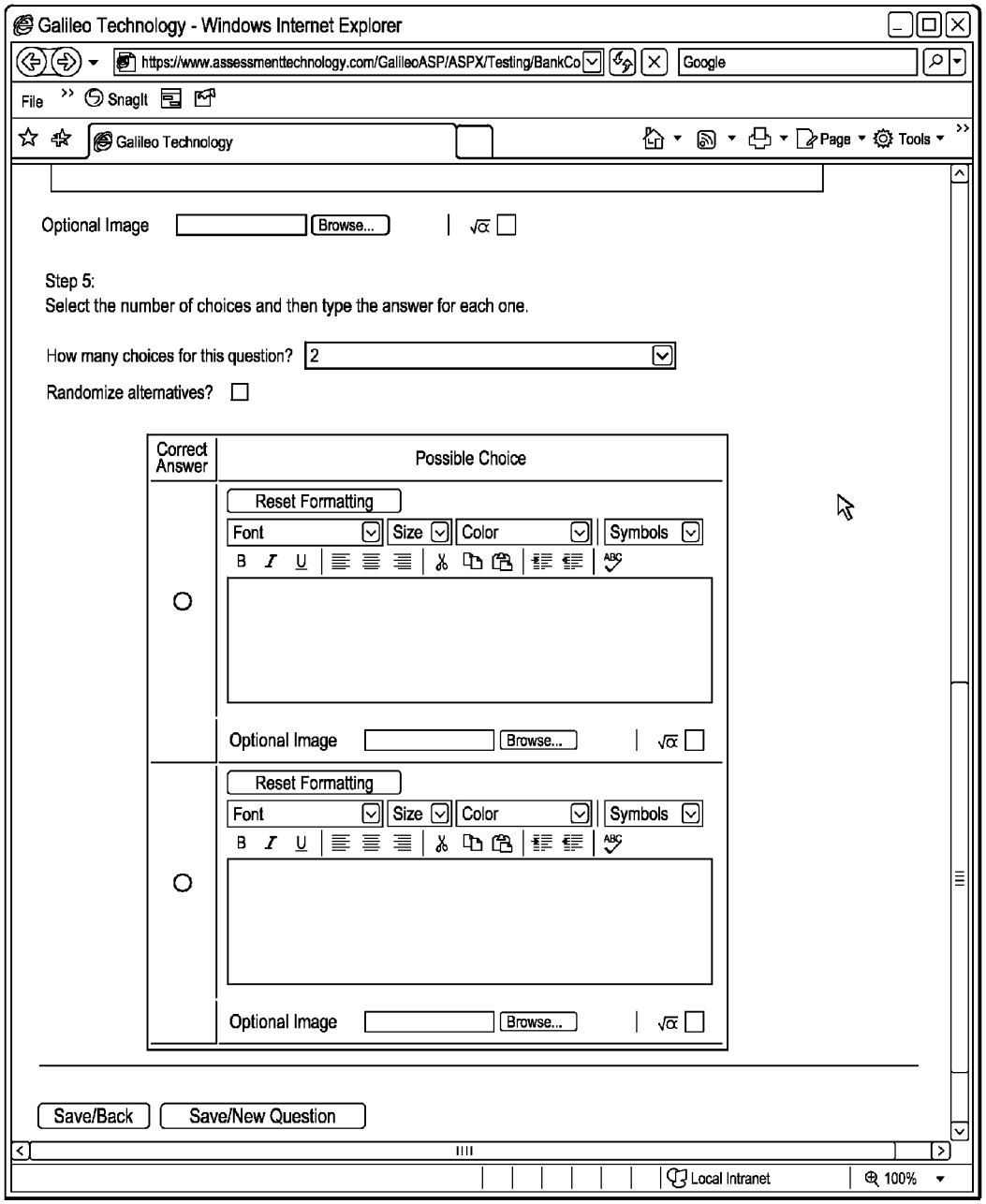
Figure 17:
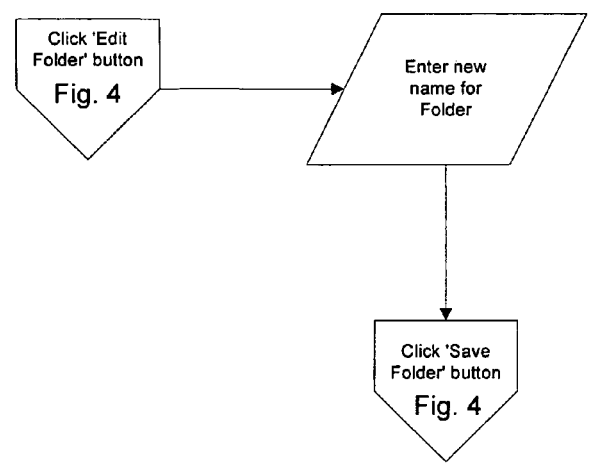
Figure 18:
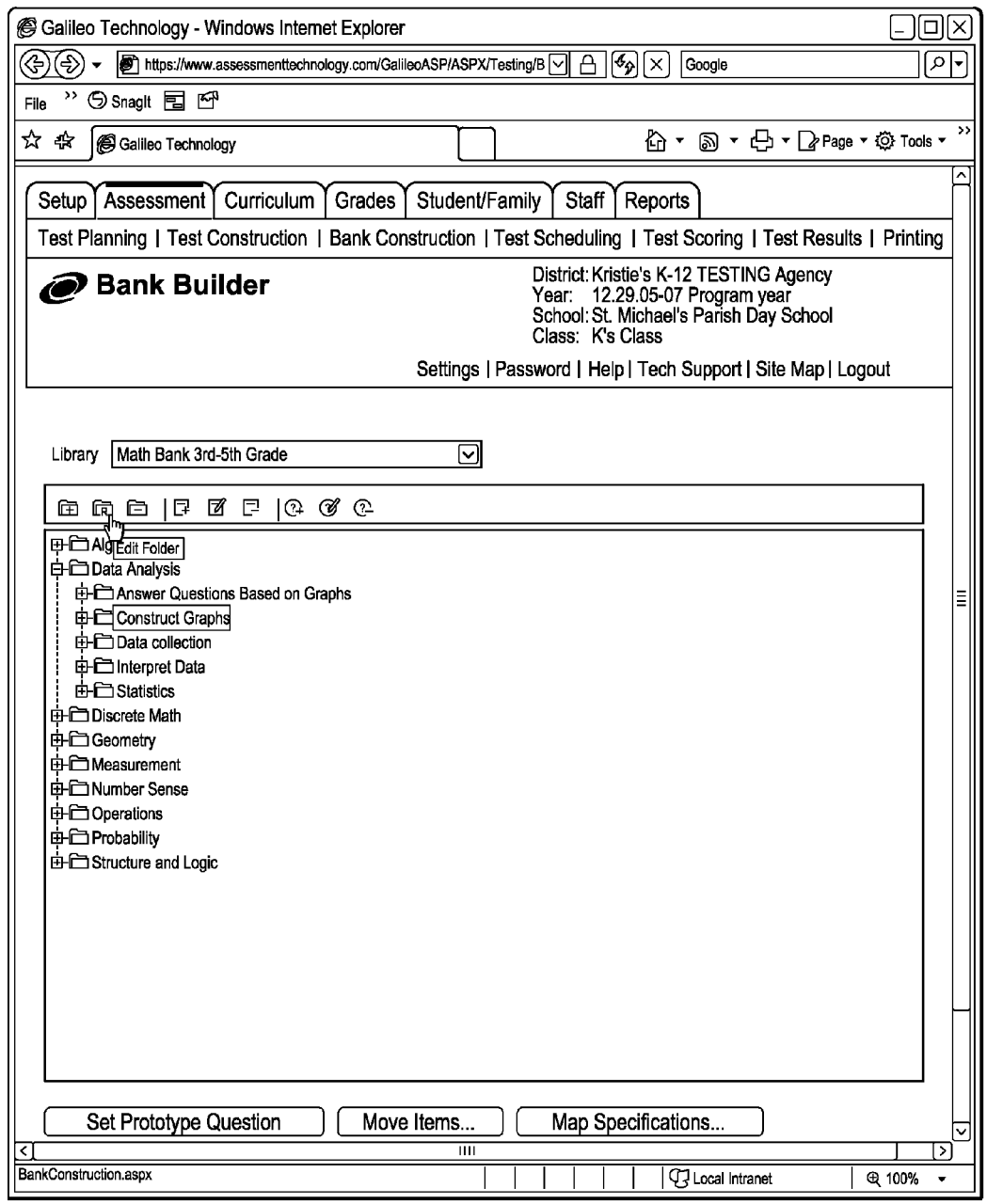
Figure 19:
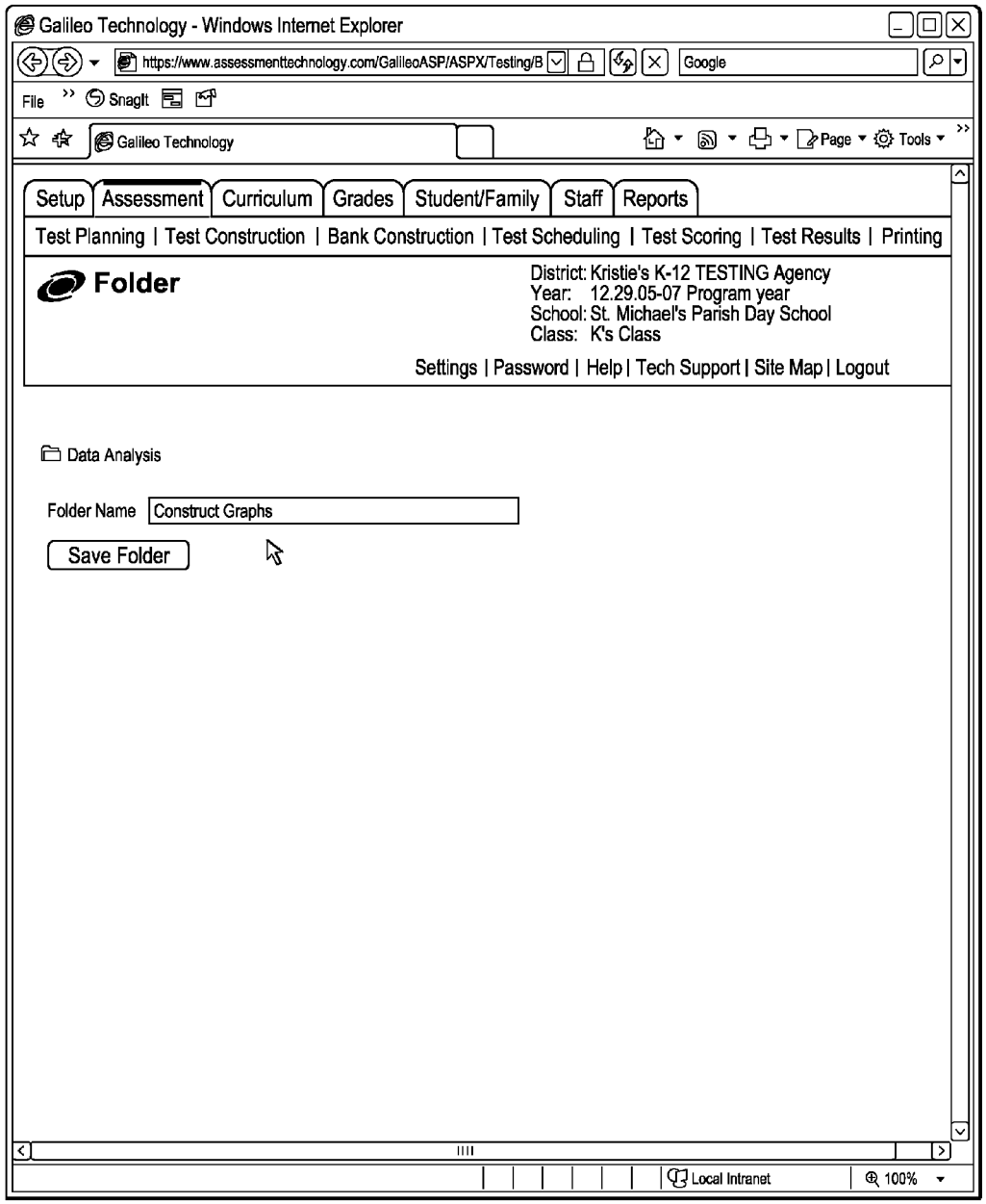
Figure 20:
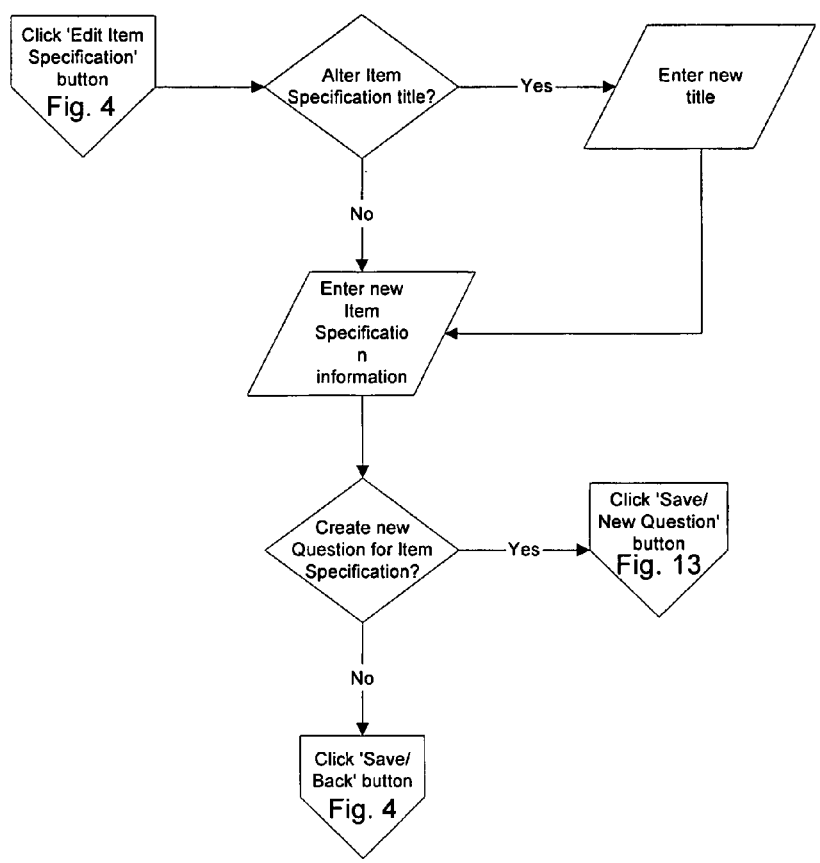
Figure 21:
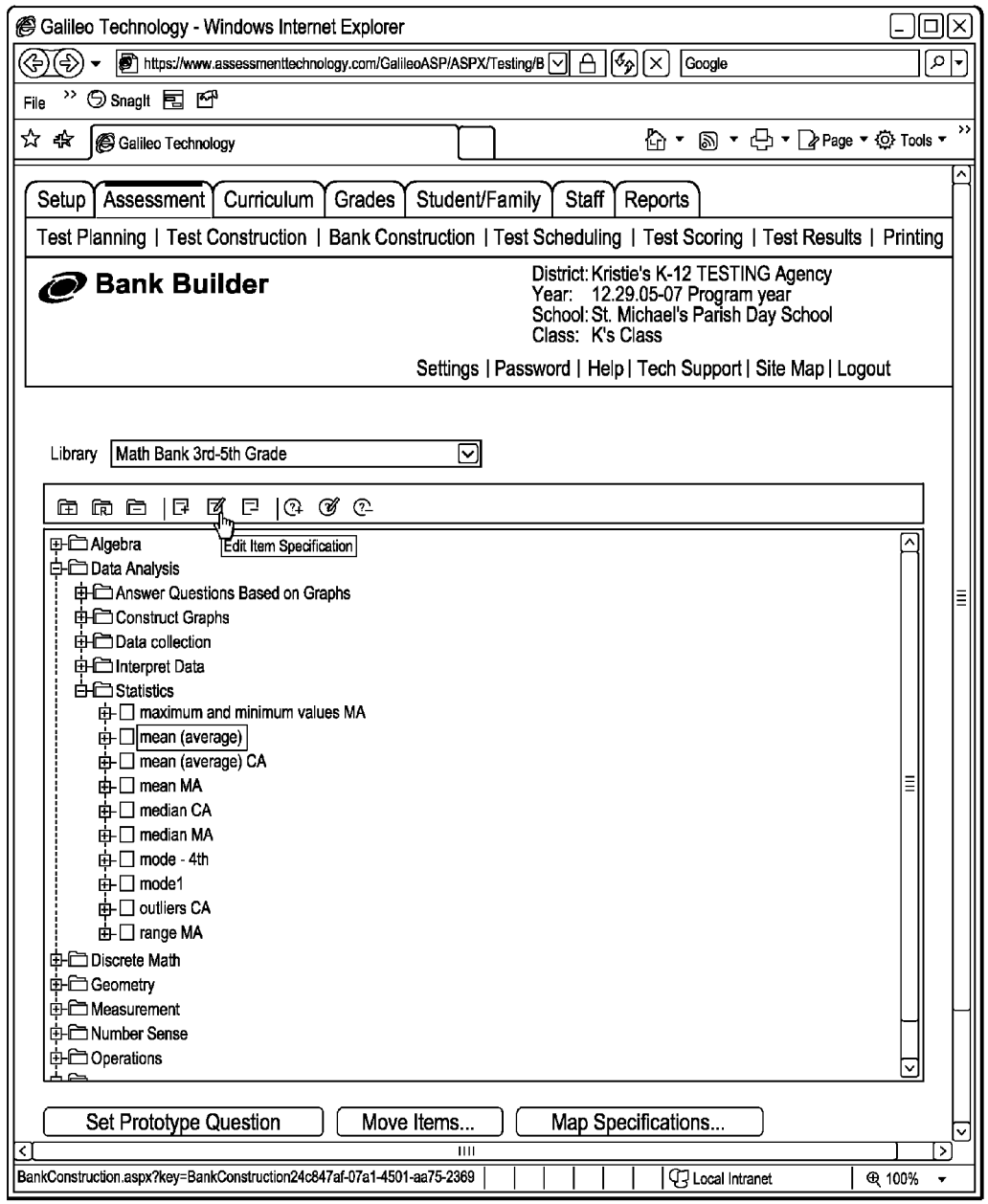
Figure 23:
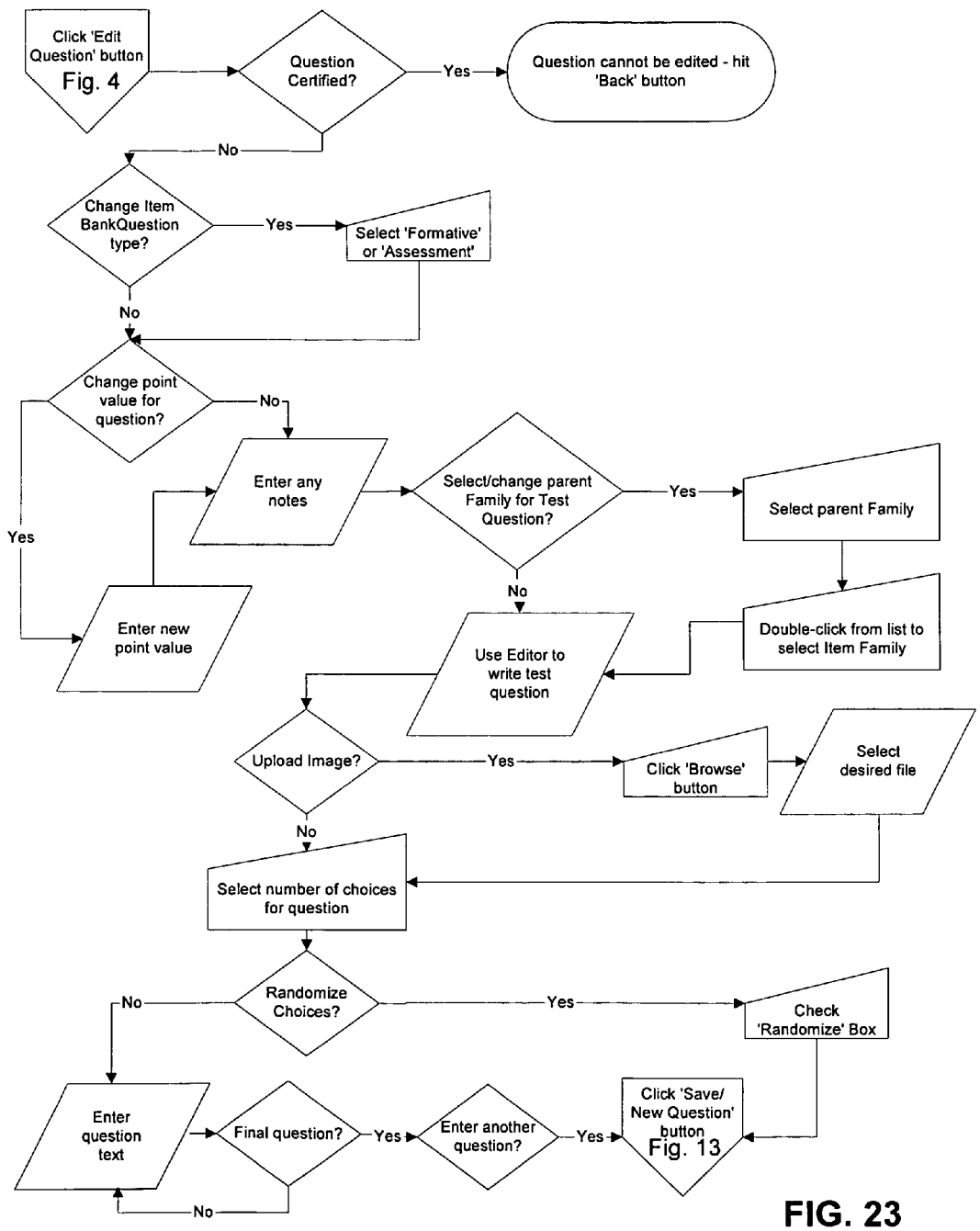
Figure 24:
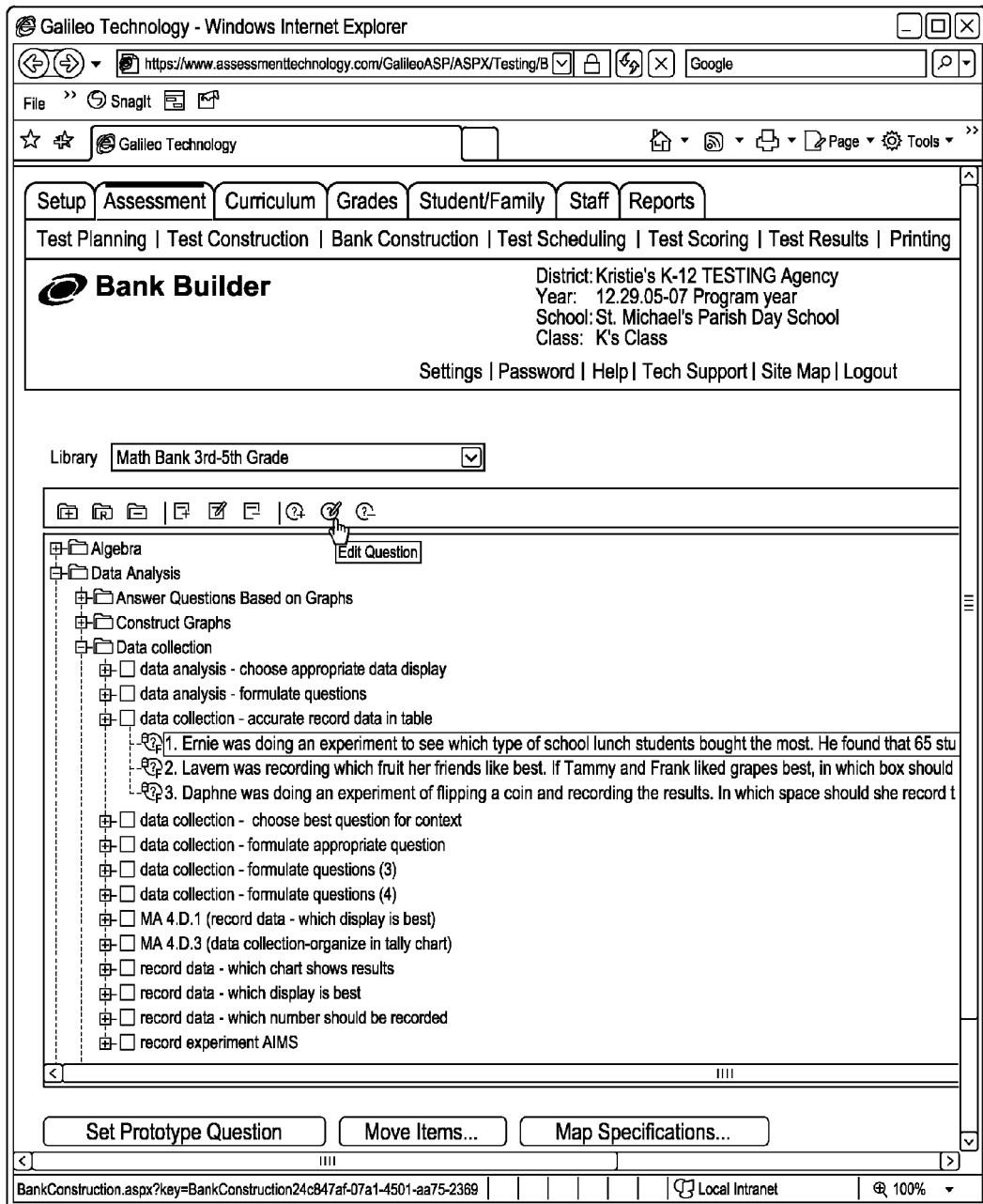
Figure 26:
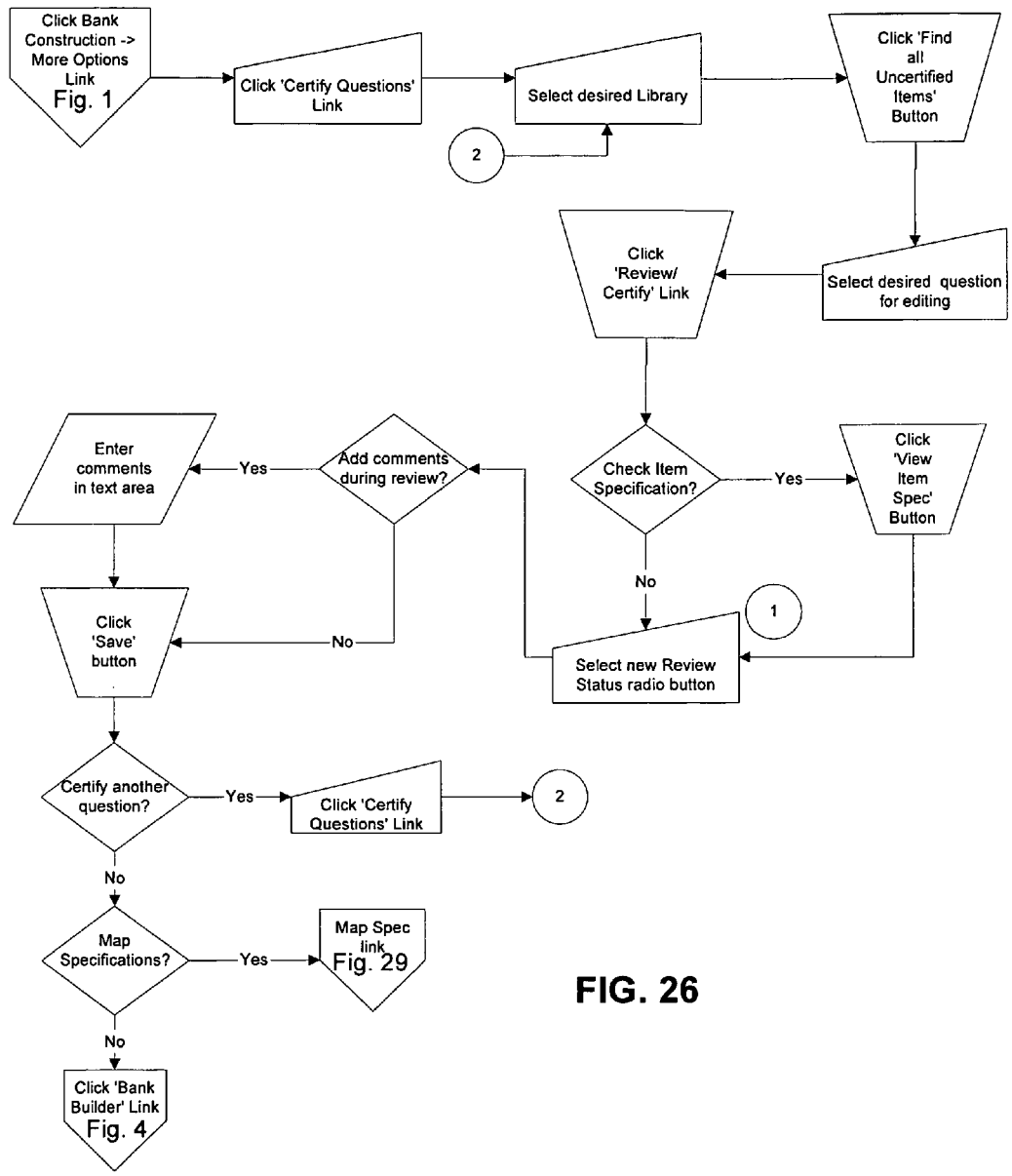
Figure 27:
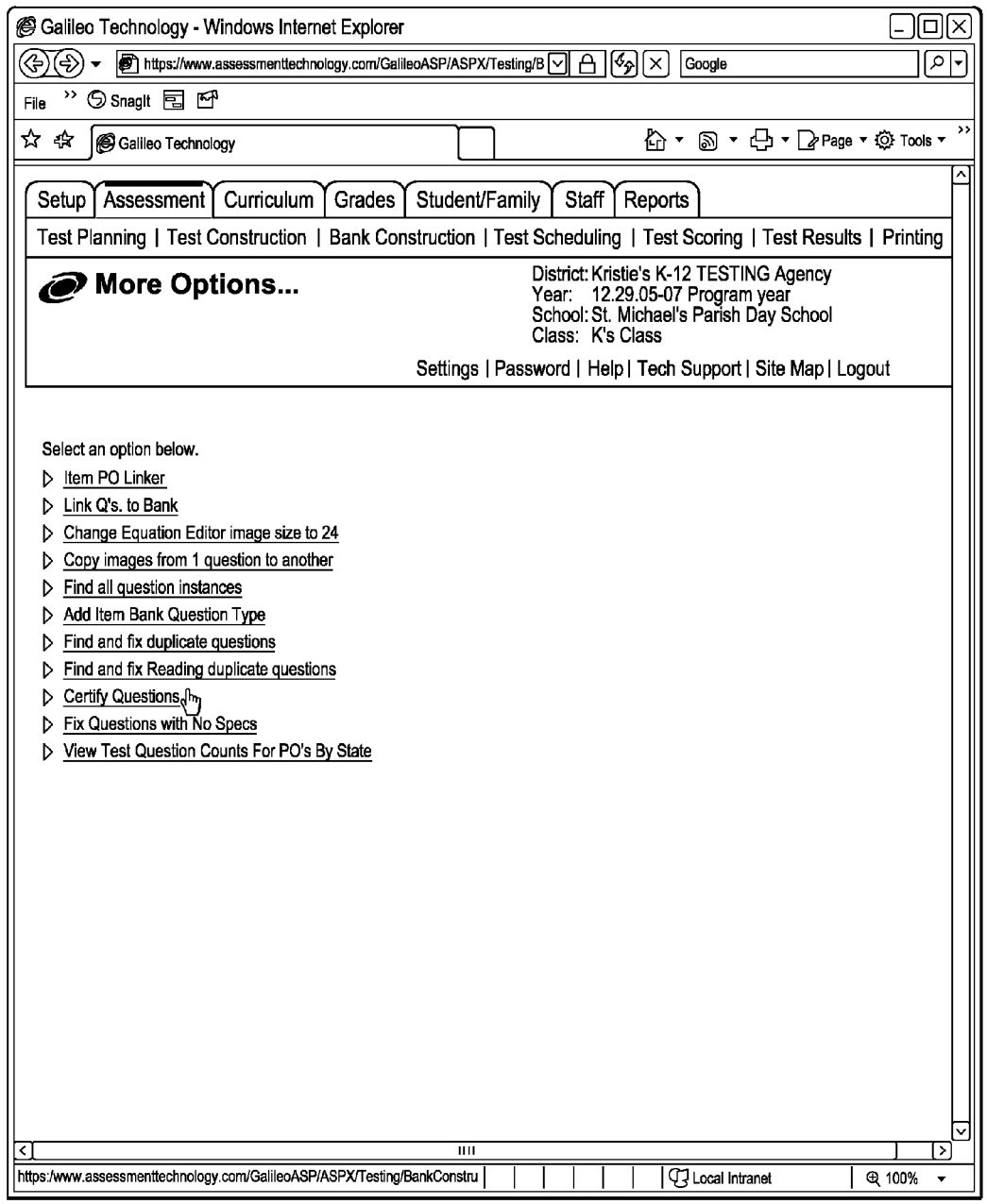
Figure 28:
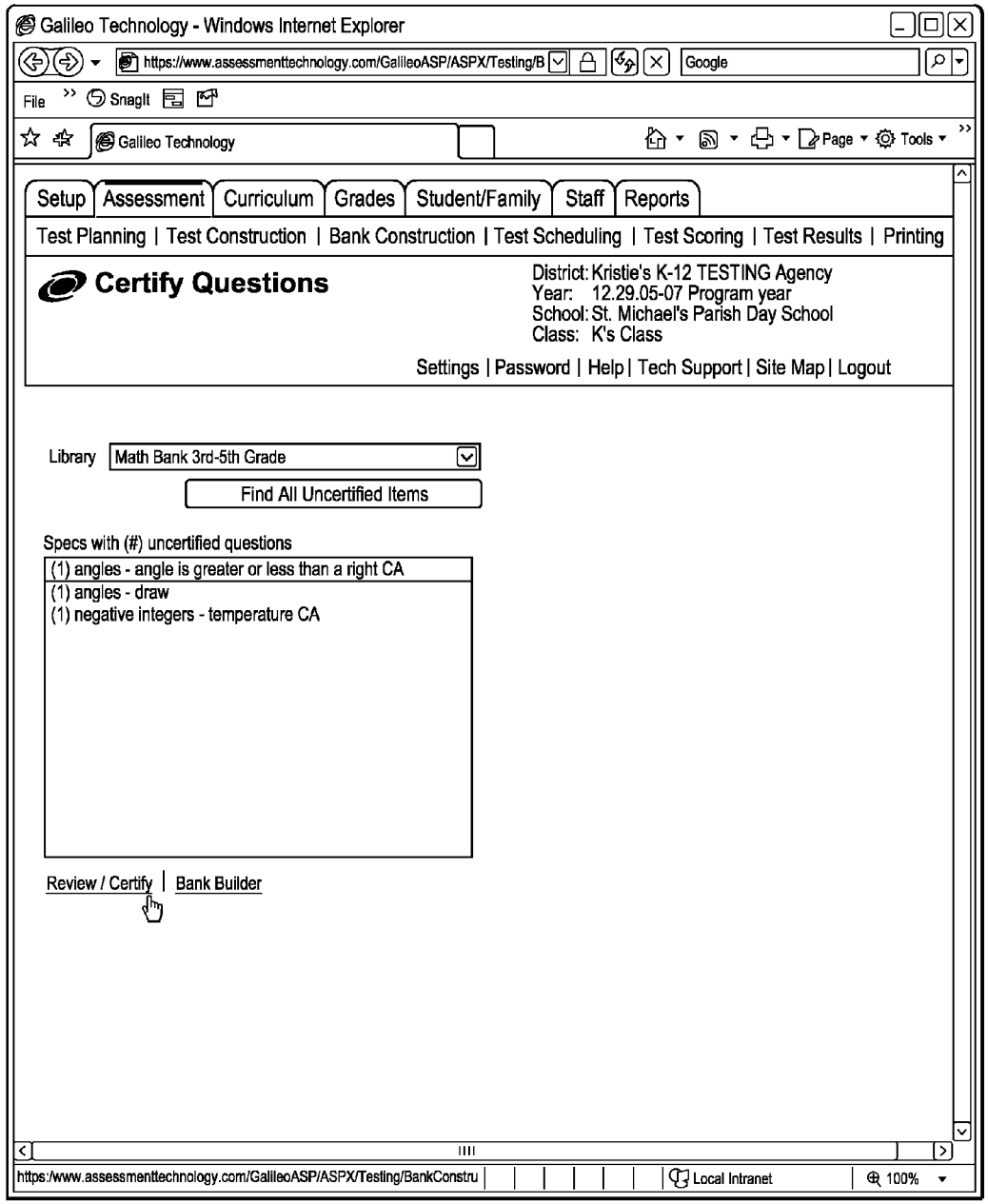
Figure 29:
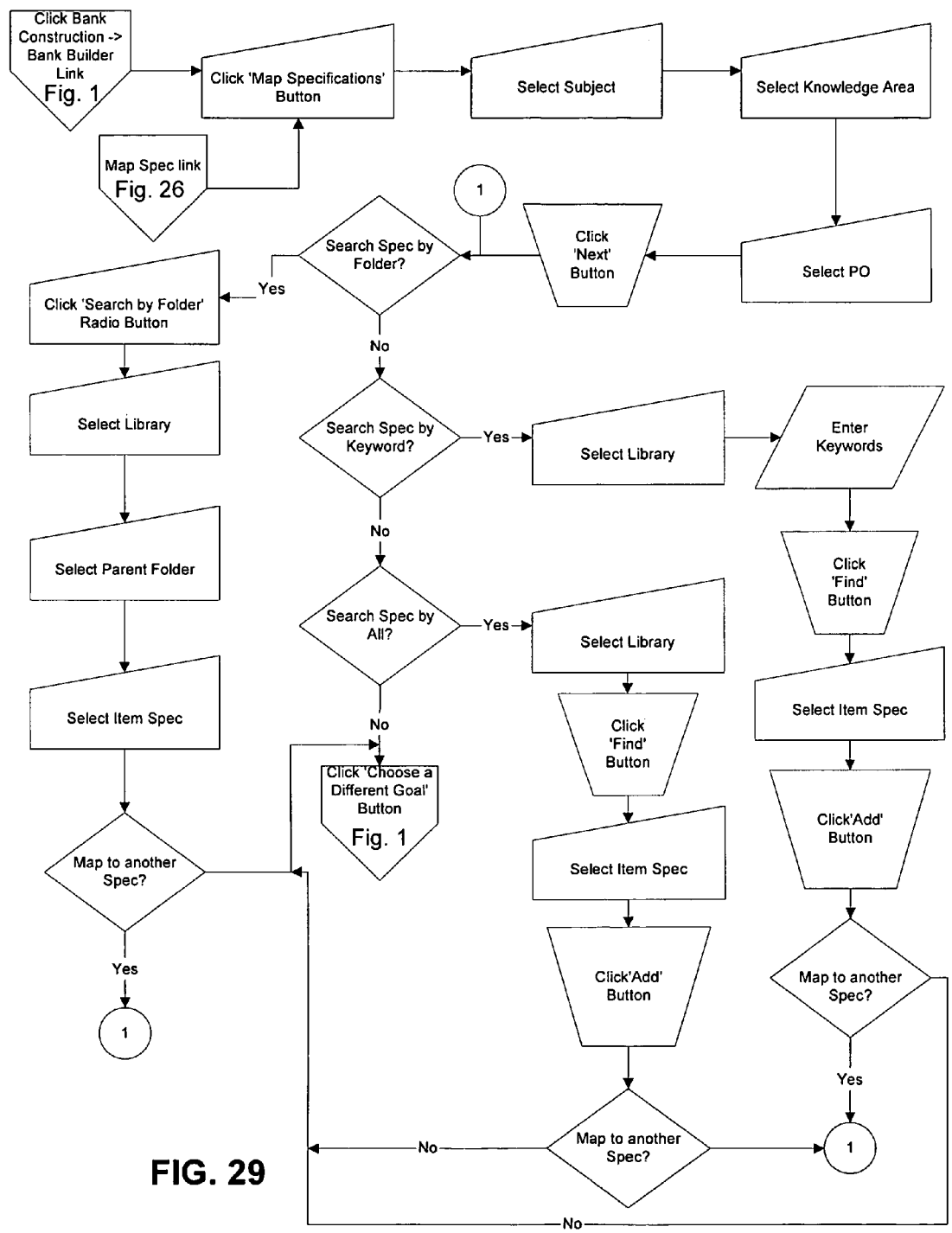
Figure 30:
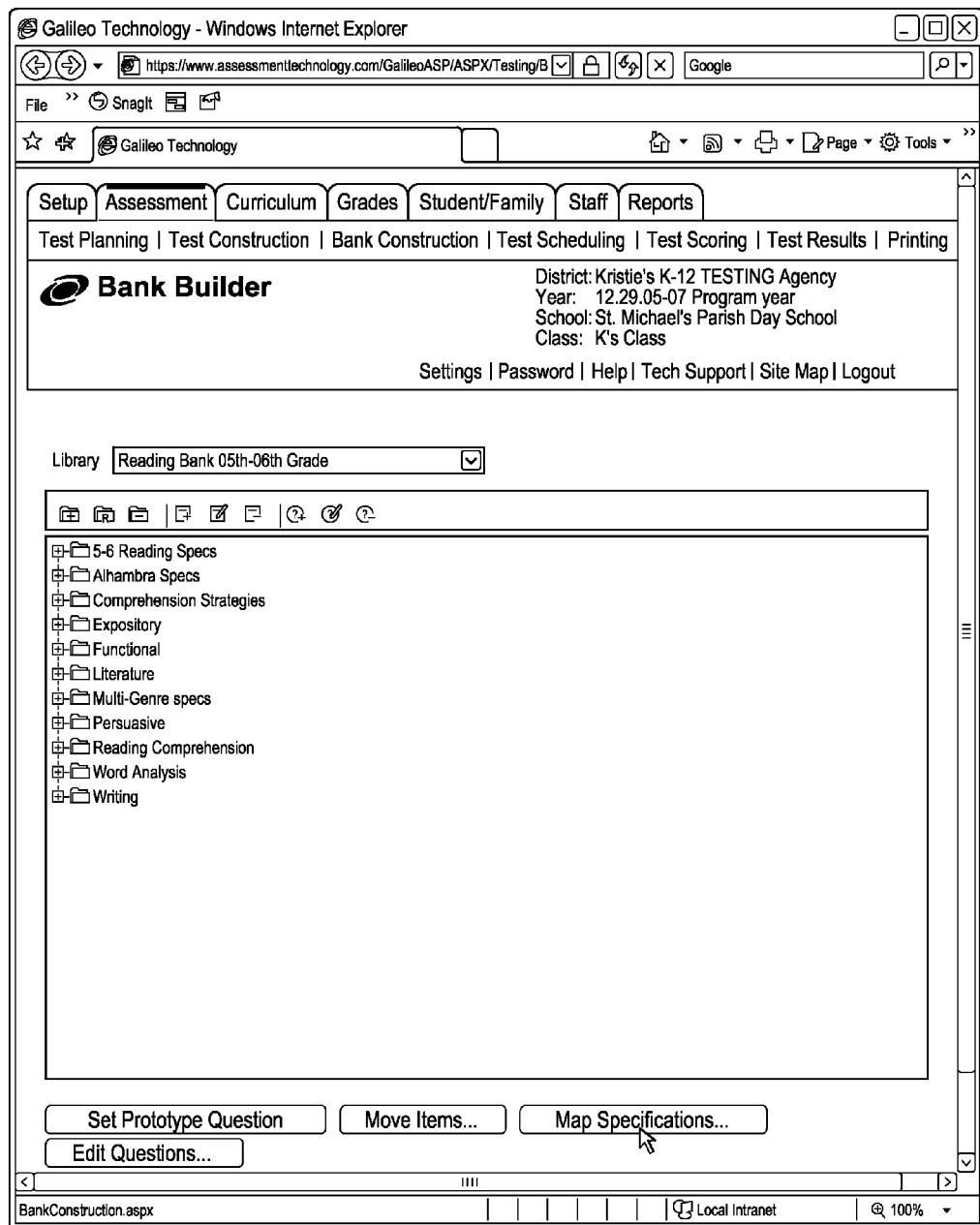
Figure 31:
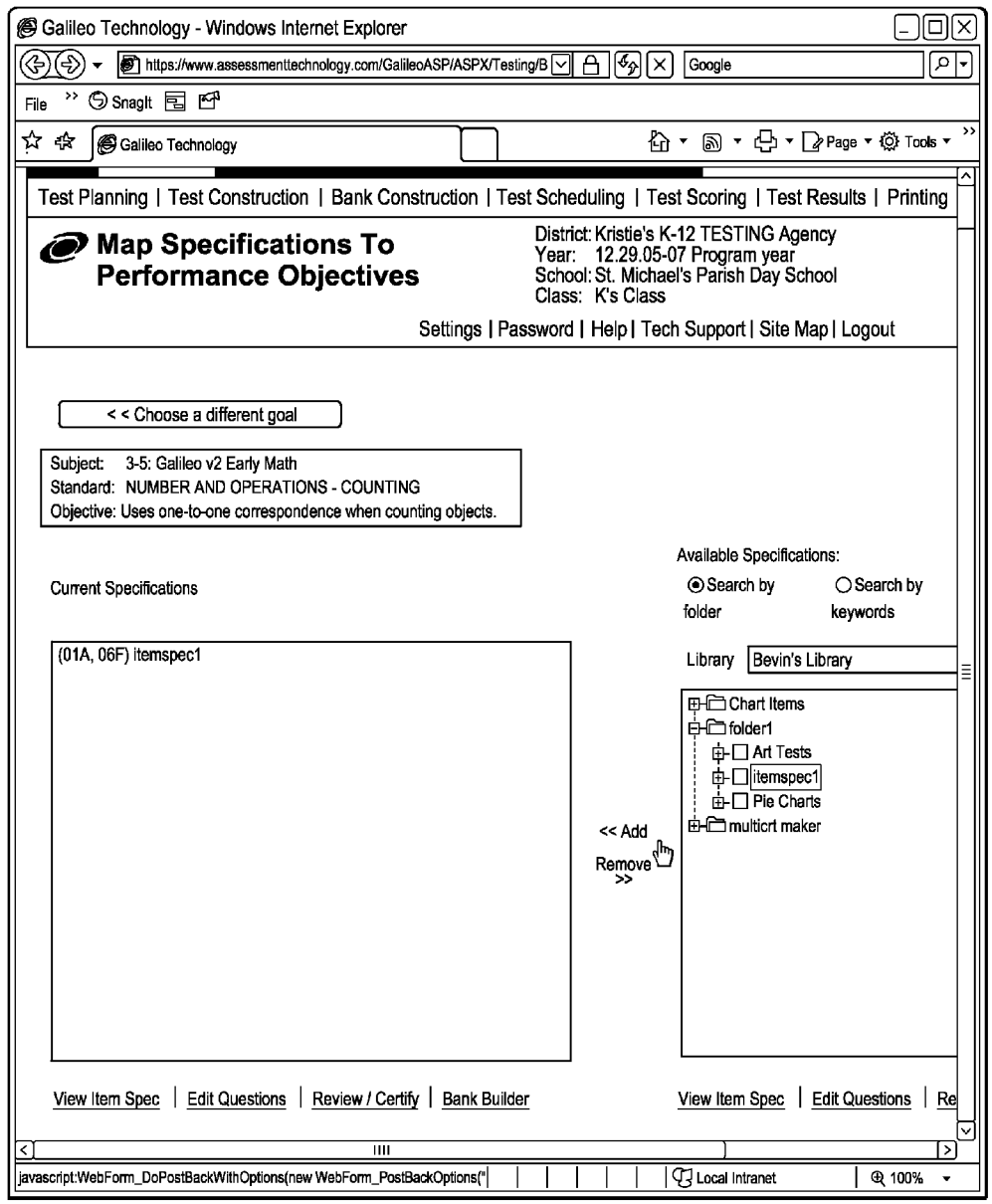
Figure 32:
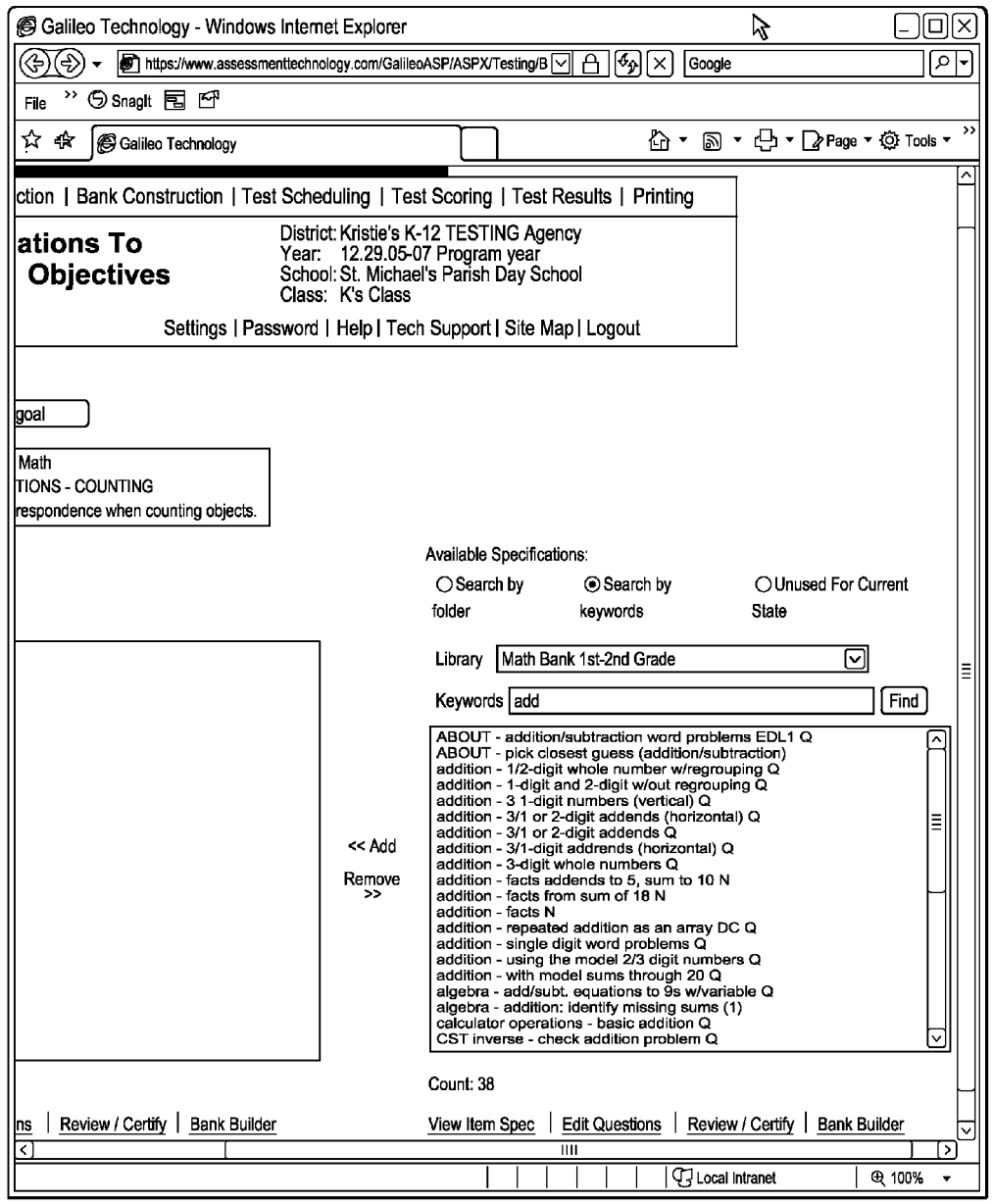
Figure 33:
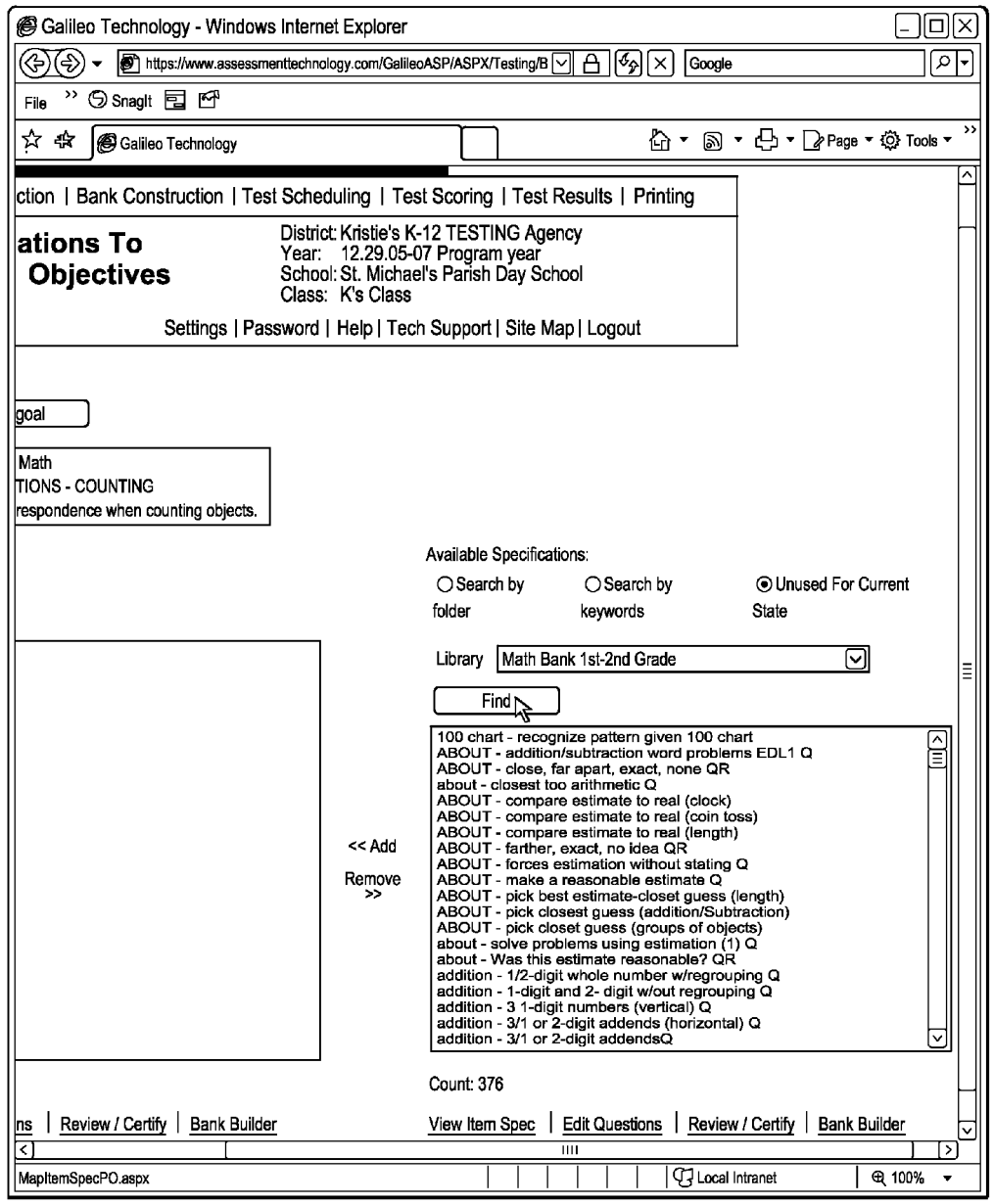

The assessment innovations include new technology to enhance the efficiency of constructing and maintaining item banks containing collections of items used in assessment initiatives requiring that test items be aligned to standards. Standards-based assessment initiatives provide a particularly important example of circumstances calling for the alignment of items to standards (e.g., Ravitch, 2001). In order to construct standards-based assessments using an item bank, bank information must include information on the standards to which the items are aligned.

The task of constructing item banks containing information aligning items to standards can be complex. The complexity arises from the fact that item banks must accommodate varying sets of standards generated by multiple agencies (e.g., state departments of education) using different terminology to label standards. For example, consider the following excerpt from a Massachusetts Learning Standard: "Accurately and efficiently add, subtract, multiply, and divide positive fractions and mixed numbers. Simplify fractions." This standard covers multiple skills. By contrast the following Arizona Performance Objective covers one capability: "Multiply proper fractions." This capability is included in the specification of the more complex Massachusetts Learning Standard. The material that follows outlines an innovative system for developing and maintaining item banks for standards-based Assessment initiatives requiring the alignment of items to multiple sets of standards.

The material in this section discusses innovations aimed at meeting the unique requirements associated with the construction and maintenance of item banks designed to serve standards-based assessment initiatives. The major tasks associated with the construction and maintenance of item banks include procedures to construct new items, to edit existing items, to delete items or make them inactive, to review items, to enter item attributes such as parameter estimates, and to enter the history of item administration. The system is unique in that all of the procedures involved in bank construction and maintenance are designed to support standards-based assessment initiatives involving the alignment of sets of items to multiple sets of standards. The discussion that follows details the innovative tools that have been developed for item construction and maintenance and spells out the ways in which those tools contribute to construction and maintenance efficiency and quality assurance in standards-based assessment.

Item Specifications Guiding Item Construction and Maintenance

All of the procedures involved in item construction and maintenance are guided by detailed sets of item specifications providing precise information regarding the required characteristics of the items included in the bank (e.g. Millman & Greene, 1989). Each item specification defines an item class comprised of sets of items conforming to the requirements of the specification. Item specifications are developed using the Bank Builder module of the Educational Management System. Bank Builder allows the user to create a new specification, edit a specification, delete a specification, move a specification to a different folder, or assign the specification to one or more standards.

The item specification screen for creating and editing specifications allows the user to enter a title for the specification, the description of the item class defined by the specification and the requirements that must be met for membership in the class. In addition, the user can assign a prototype item to the specification to serve as a model for the construction of items meeting specification requirements. Each item specification may be assigned to one or more sets of learning standards and to one standard within each set of standards. The standards and sets of standards to which the specification has been assigned are listed on the item specification screen.

In the system, item specifications are linked directly to item construction, item editing, and item review. These links promote the direct application of specifications during the construction, editing, and review processes. Most importantly, they are the key to making it possible to link sets of items to multiple sets of standards.

Item Construction and Editing Procedures

Item construction and editing are carried out using Bank Builder. Bank Builder allows the user to specify the type of item to be constructed, the points available for the item, and the type of bank to which the item is assigned. The system accommodates two types of banks: One includes items to be used in extended formal agency-wide assessments such as benchmark tests and end-of-course examinations. The second type contains items used in formative assessments such as classroom quizzes.

Bank Builder provides standard text editing and equation editing features that can be used to construct a broad range of item types including multiple choice items, true-false items, yes-no items, short answer items, extended constructed response items, and work samples. The system is also capable of importing items involving animation. In addition, Bank Builder can automatically generate various kinds of charts and can import images and assign them to particular components of an item. For example, a multiple-choice item might include an image attached to the item stem and images attached to each of the alternatives. Bank Builder includes an Item Family feature that makes it possible to link a set of items to a text or image. Items linked in this fashion are displayed along with the linked text or image, which appears only once. For multiple-choice items, Bank Builder includes the option of randomizing the order in which alternatives are displayed. For constructed response and work sample items, Bank Builder allows the item writer to specify scoring rules for assigning points to examinee responses.

The link binding each item created in Bank Builder to an item specification is established when a new item is created. Bank Builder requires that each new item be assigned to an item specification. As soon as the assignment is made, the specification can be linked to all bank construction and maintenance procedures. The item specification can be displayed in a popup window as a new item is written or as an item is edited. The easy availability of the specification enhances efficiency during the item creation and item editing processes. When a specification is not readily available, it may take time to retrieve it. Moreover, in some instances the specification may not be found, in which case there will likely be a temptation to write items based on the writer's memory of the specification. This may lead to the production of items that do not match specification requirements.

Item editing tools in the system include the capability to edit one item displayed on a single screen or to edit on a screen displaying all of the items included in an item specification. The screen displaying all items is particularly useful for making edits to insure consistent adherence to specification requirements. The item writer using this screen is able to view the specification, make a series of edits to multiple items and save all of the edits at once.

Item Review and Certification Procedures

Item review and certification processes in the system provide information on the extent to which items meet specifications. The item-review feature of the system contains a number of unique features:

The item review screen displays items directly linked to an item specification. The set of items that can be displayed includes all items associated with the selected specification.

The item specification can be displayed in a popup window linked to the review screen.

The item review screen allows the reviewer to classify items in terms of review categories. For example, items may be classified in terms of the following categories: Not Reviewed, Needs Modification, Accept, and Accept and Certify.

Items can be displayed by category. For example, a reviewer may elect to display only those items already classified as needing modification.

A comment box allows the reviewer to explain the basis for the selected classification.

An item writer responding to a review may click on an item displayed in the review screen and be taken directly to a screen allowing the writer to edit the item.

The system automatically prevents items that have not been certified from being used in assessments under construction.

Classification and Mapping Procedures

Unique classification and mapping procedures have been developed to make it possible to efficiently map items to multiple sets of standards. The procedures classify data objects including test items, item attributes, and item specifications (e.g. Millman & Greene, 1989) using a standard hierarchical tree structure. The leaf nodes in the structure are data objects containing items and their attributes. Each data object belongs to a single item class specified in a parent node, which contains one unique item specification and one class label. For example, a set of items might be included in a class labeled Multiplication of Proper Fractions. A standard item specification (e.g. Millman & Greene, 1989) defines the requirements for membership in the class and provides a prototype item illustrative of class membership.

The procedures make it possible to map an item class including the item specification, class label, and the sets of data objects (items and attributes) included in the class to different sets of standards. For example, items and attributes in the Multiplication of Proper Fractions class could be mapped to a standard in Arizona and to a standard in Massachusetts. The technology restricts the mapping to one standard within a standard set. Thus, if items in the Multiplication of Proper Fractions class were mapped to a particular performance objective in Arizona, they could not be mapped to another performance objective in that state.

The classification and mapping procedures increase efficiency in item bank construction and maintenance in the following ways:

- Sets of items rather than individual items are mapped to each standard. This reduces that labor involved in aligning items to a standard.
- An item can belong to only one class and an item specification can belong to only one class. This reduces the likelihood of creating duplicate items and assigning duplicate items to the same standard.
- An item class can be mapped to only one standard within a given set of standards. This reduces the likelihood of assigning duplicate items to different standards measured on the same assessment. It also helps to insure that any given standard will be assessed by a unique set of items.
- Sets of items can be mapped to more than one standard when each standard is in a different set of standards. This increases the number of items available for assessments constructed using different sets of standards.

Many variations, modifications and changes may be made in the above described example without departing from the scope and spirit of the invention.

The invention claimed is:

1. A computer-implemented item banking system for test items used in standards-based assessments comprising:
    a plurality of item specifications developed using a specification building feature to create new, edit, move, and delete specifications and to assign each item specification to exactly one corresponding performance objective of each of multiple different standards;
    a plurality of test items each constructed and edited using a test building feature so as to comply with a selected one of the item specifications, the test building feature further enabling a user to specify a type of test item being constructed, points available for the test item, and a selected type of item bank to which the test item is assigned,
    wherein the item bank type is selectable from available item bank types including an agency-wide benchmark assessments item bank type, and a formative assessments item bank type;
    a test item review and certification feature for certifications of test items, wherein said test item review and certification feature is configured to generate:
        a graphical screen display that displays all of the test items linked to a selected one of the plurality of item specifications, so as to assist a user of the system in constructing tests aligned to educational standards,
        a display of available item classifications for a selected test item to enable a reviewer to classify the selected test item in terms of a selected one of a predetermined set of review categories, wherein said set of review categories includes Not Reviewed, Needs Modification, Accept, and Accept and Certify review categories, and
        system protection for preventing use of not yet certified test items to be used in agency-wide assessments under construction.

2. The computer-implemented item banking system according to claim 1 wherein a test item and an item specification are each mapped to only one item class, and an item class is mapped to only one standard within a single set of standards.

3. The computer-implemented item banking system as claimed in claim 2 wherein sets of test items, via mapping to item specifications, are mapped to more than one standard only when each of the standards is in a different set of standards.

4. The computer-implemented test items banking system according to claim 1 wherein the system is configured to generate a display of the selected item specification in a popup window within a review screen of the test item review feature.

5. The computer-implemented test items banking system according to claim 1 wherein the system is configured to generate a screen display of test items selected by one of the predetermined set of review categories.

6. The computer-implemented test items banking system according to claim 1 wherein the system is configured to generate a screen display of a comment box for a reviewer to enter an explanation of a basis for the selected classification.

7. The computer-implemented test items banking system according to claim 6 wherein the system is configured to display the corresponding item specification during on-screen review of an assessment item by a reviewer to improve compliance with the item specification.

8. The computer-implemented test items banking system according to claim 1 wherein the system is configured to display the corresponding item specification while a user is using the test building feature to create a new test item, to help ensure compliance with the item specification.

9. A non-transitory computer-readable medium encoded with a computer executable data structure comprising instructions for implementing the recited features of claim 1.

10. A computer-implemented method to construct and maintain an item bank containing a collection of items for use in assessments of learners, the method comprising:
    (a) storing, in a storage, first data comprising a first set of educational standards promulgated by a first agency, each one of the first set of standards comprising at least one corresponding skill or performance objective;
    (b) storing, in said storage, second data comprising a second set of educational standards promulgated by a second agency, each one of the second set of standards comprising at least one corresponding skill or performance objective;
    (c) using a computer having access to the storage, creating at least one item specification, the item specification defining an item class comprised of items each having characteristics required by the item specification;
    (d) using the computer, entering a title for the item specification, a description of the item class defined by the item specification, and the requirements imposed by the item specification for membership in the item class, wherein the requirements including at least one specified skill or performance objective;
(e) using the computer, assigning the item specification to exactly one performance objective in the first set of educational standards, and to exactly one performance objective in the second set of educational standards;
(f) using the computer, storing the item specification in association with a selected library of test items;
(g) using the computer, creating a new item to add to a selected library of test items, wherein creating said new item includes selecting an item bank question type, entering a point value for the new item, and the selecting a type of bank to which the new item is assigned, and wherein the item specification is displayed via a popup window as the new item is written or edited; and
(h) using the computer, mapping the new item to a selected item specification, whereby the item is automatically and correctly associated to both the first set of standards and the second set of standards based on a mapping procedure.

11. The method of claim 10 wherein the first and second agencies are different educational entities within the U.S. federal government.

12. The method of claim 10 wherein the first and second agencies are different state education agencies.

13. The method of claim 10 wherein exactly one of the first and second agencies are different local education agencies.

14. The method of claim 10 wherein one of the first and second agencies is a state, local or federal education within a different parent agency than the other one of the first and second agencies.

15. The method of claim 10 wherein the type of bank is selected from a set that includes (a) a first type of bank that includes items to be used in agency-wide assessments, and (b) a second type of bank that includes items to be used in formative assessments including classroom quizzes.

16. The method of claim 15 wherein the method is deployed via a web browser.

* * * * *